United States Patent

Soundararajan et al.

(10) Patent No.: US 8,966,521 B2
(45) Date of Patent: Feb. 24, 2015

(54) METHODS AND APPARATUS TO PRESENT SUPPLEMENTAL MEDIA ON A SECOND SCREEN

(71) Applicants: Padmanabhan Soundararajan, Tampa, FL (US); Venugopal Srinivasan, Tarpon Springs, FL (US); Alexander Topchy, New Port Richey, FL (US)

(72) Inventors: Padmanabhan Soundararajan, Tampa, FL (US); Venugopal Srinivasan, Tarpon Springs, FL (US); Alexander Topchy, New Port Richey, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 18 days.

(21) Appl. No.: 13/827,943

(22) Filed: Mar. 14, 2013

(65) Prior Publication Data

US 2014/0282693 A1 Sep. 18, 2014

(51) Int. Cl.
| | |
|---|---|
| H04N 7/10 | (2006.01) |
| H04N 7/025 | (2006.01) |
| H04N 7/16 | (2011.01) |
| H04N 5/783 | (2006.01) |
| H04N 21/41 | (2011.01) |
| H04N 21/435 | (2011.01) |

(52) U.S. Cl.
CPC ......... *H04N 21/4122* (2013.01); *H04N 21/435* (2013.01)
USPC ................ 725/32; 725/40; 725/42; 725/43; 725/78; 725/133; 725/141; 725/153; 386/343

(58) Field of Classification Search
CPC .......................... H04N 21/4126; H04N 21/812
USPC ............... 725/32, 36, 40, 42, 43, 81, 78, 114, 725/133, 141, 153; 386/343
See application file for complete search history.

(56) References Cited

U.S. PATENT DOCUMENTS

| | | | | |
|---|---|---|---|---|
| 6,816,201 | B1 * | 11/2004 | Fang et al. | 348/468 |
| 7,043,746 | B2 | 5/2006 | Ma | |
| 7,302,696 | B1 * | 11/2007 | Yamamoto | 725/23 |
| 8,307,390 | B2 | 11/2012 | Holden | |
| 8,359,613 | B2 * | 1/2013 | Fellenstein et al. | 725/32 |
| 2002/0144262 | A1 * | 10/2002 | Plotnick et al. | 725/32 |
| 2002/0162121 | A1 * | 10/2002 | Mitchell | 725/135 |
| 2003/0149621 | A1 | 8/2003 | Shteyn | |
| 2003/0229893 | A1 * | 12/2003 | Sgaraglino | 725/37 |

(Continued)

FOREIGN PATENT DOCUMENTS

WO 02082374 A2 10/2002

OTHER PUBLICATIONS

Chmielewski, Dawn C., "ConnecTV is bringing ads to TV viewers' mobile devices", Los Angeles Times, Jan. 4, 2013 (3 pages).

(Continued)

*Primary Examiner* — Pinkal R Chokshi
(74) *Attorney, Agent, or Firm* — Hanley, Flight & Zimmerman, LLC

(57) ABSTRACT

Methods and apparatus to present supplemental media on a second screen are disclosed. An example method includes obtaining, at a digital media device, media identifying data from audio data of a portion of first media being presented via the digital media device; determining that the portion of the first media is an advertisement based on the media identifying data; detecting, at the digital media device, a command to cause the digital media device to skip the portion of the first media; and providing an indication to a second device in response to detecting the command, the indication to cause the second device to present second media.

29 Claims, 13 Drawing Sheets

(56) References Cited

U.S. PATENT DOCUMENTS

| | | | |
|---|---|---|---|
| 2004/0117857 A1* | 6/2004 | Bisdikian et al. | 725/141 |
| 2004/0168207 A1* | 8/2004 | Kelly et al. | 725/139 |
| 2007/0074243 A1 | 3/2007 | Verhaegh et al. | |
| 2007/0101360 A1 | 5/2007 | Gutta et al. | |
| 2007/0124758 A1* | 5/2007 | Sung et al. | 725/22 |
| 2007/0294292 A1 | 12/2007 | Hydrie et al. | |
| 2008/0021783 A1* | 1/2008 | Varghese | 705/14 |
| 2008/0152300 A1 | 6/2008 | Knee et al. | |
| 2008/0193102 A1* | 8/2008 | Tischer | 386/68 |
| 2009/0265734 A1 | 10/2009 | Dion et al. | |
| 2010/0077435 A1* | 3/2010 | Kandekar et al. | 725/61 |
| 2010/0115548 A1 | 5/2010 | Leyvi | |
| 2010/0325660 A1 | 12/2010 | Holden | |
| 2011/0162002 A1* | 6/2011 | Jones et al. | 725/32 |
| 2011/0202270 A1 | 8/2011 | Sharma et al. | |
| 2012/0114305 A1* | 5/2012 | Holden | 386/249 |
| 2012/0144416 A1* | 6/2012 | Wetzer et al. | 725/14 |
| 2012/0174149 A1* | 7/2012 | Reynolds et al. | 725/31 |
| 2012/0233639 A1* | 9/2012 | Zott et al. | 725/41 |
| 2012/0240146 A1* | 9/2012 | Rao | 725/25 |
| 2012/0254931 A1 | 10/2012 | Oztaskent et al. | |
| 2013/0019262 A1 | 1/2013 | Bhatia et al. | |
| 2013/0031579 A1 | 1/2013 | Klappert | |

OTHER PUBLICATIONS

Kastelein, Richard, "ConnecTV Brings Ads to Second Screen", App. MarketTV, Jan. 7, 2013 (4 pages).

Gras, Ricard, "White Paper—Second Screen", Crowdpark, Oct.-Nov. 2011 (12 pages).

Belsky, Gary, "A Simple Way to Get TV Viewers to Stop Skipping the Ads", Time, Nov. 14, 2012 (3 pages).

Patent Cooperation Treaty, "The International Search Report and the Written Opinion of the International Searching Authority," issued in connection with Application No. PCT/US2014/023541, Sep. 15, 2014, 12 pages.

IP Australia, "Patent Examination Report No. 1," issued in connection with Application No. 2013204927, Nov. 25, 2014, 3 pages.

* cited by examiner

METHODS AND APPARATUS TO PRESENT SUPPLEMENTAL MEDIA ON A SECOND SCREEN

FIELD OF THE DISCLOSURE

This disclosure relates generally to digital media, and, more particularly, to methods and apparatus to present supplemental media on a second screen.

BACKGROUND

The use of Digital Video Recorders (DVR) has become more widespread. The use of DVRs has changed the way audiences consume media. While media exposure is generally believed to have increased because audiences are no longer limited to viewing programs during designated time slots, DVRs allow advertisements that support the programs to be fast forwarded or otherwise skipped or avoided by the audience. Avoidance of exposures to advertising by an audience causes the advertisement to lose value to the advertiser.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Example methods and apparatus disclosed herein use audience measurement techniques to detect when advertisements are being skipped during presentation of media (e.g., by fast forwarding, changing channels, a 30-second jump forward, pausing and resuming at live media, etc.). When advertisement skipping is detected, example methods and apparatus disclosed herein provide supplemental media to a second screen associated with the user or location skipping the advertisement. Example supplemental media may include the skipped advertisement, another advertisement from the same advertiser or a different advertiser, a redeemable offer, a link to an advertiser's web site or another web site, a message or other notification, an interactive and informative game, or any other type of media. Some example methods and apparatus disclosed herein do not deliver advertising when portions of media are skipped or fast forwarded.

Example methods and apparatus disclosed herein control the ability to skip media such as advertising. In some examples, the privilege of skipping advertisements is provided to the user on condition that the user register or link a second screen (e.g., a computing and/or display device, which may be provided with a designated application) to display supplemental media. Such example methods and apparatus may disable or suppress fast forwarding or skipping of advertising until such a registration or linkage occurs.

While examples are disclosed herein as detecting fast forwarding commands from a user to skip advertising, these examples may be modified and/or supplemented to detect advertisement or other media skipping during live media broadcasts via channel changes. For example, if a channel change is detected during an advertisement, example methods and apparatus disclosed herein provide supplemental media for display on the second screen. Example methods and apparatus disclosed herein may additionally or alternatively detect advertisement or other media skipping during live media broadcasts via pausing the media being broadcast (e.g., buffering the media in a storage device while pausing playback via a DVR) and then restarting playback of the media at a later time (e.g., a "live TV" button that causes playback to start again with the live media broadcast and/or in substantially real time). Such pausing and skipping to live TV can effectively permit skipping of advertisements.

Example methods and apparatus disclosed herein use more reliable methods of identifying programming and advertising to deliver supplemental media (e.g., content and/or advertisements). Example methods and apparatus disclosed herein further provide control over whether such advertising can be skipped until a user agrees to permit supplemental media to be delivered.

Figure 1:
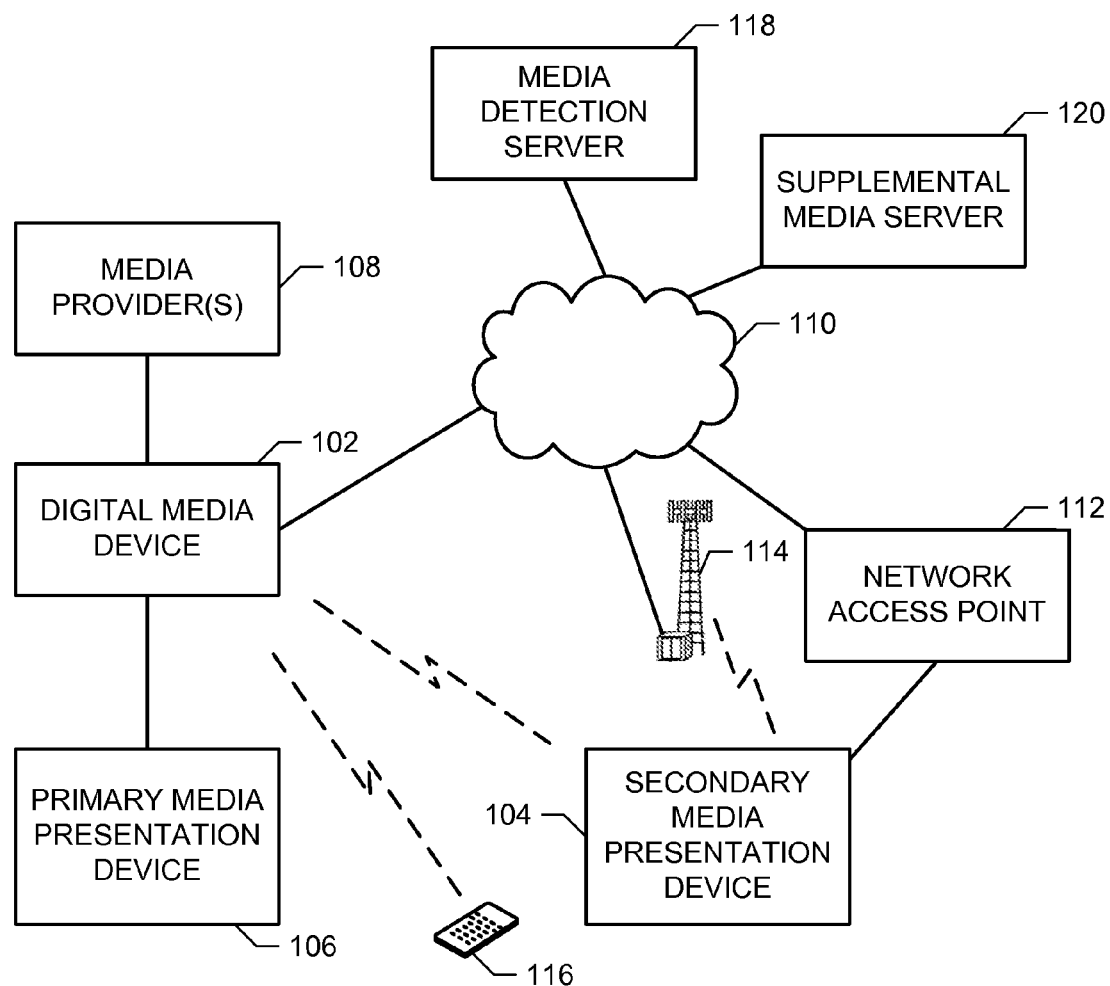
FIG. 1 is a block diagram of an example system constructed in accordance with the teachings of this disclosure to detect skipping of media via a digital media device and to present media on a secondary display device.

FIG. 1 is a block diagram of an example system 100 constructed in accordance with the teachings of this disclosure to detect skipping of media via a digital media device 102 and to present media on a secondary media presentation device 104 (e.g., a tablet computer such as an iPad™). The example system 100 of FIG. 1 may be used to, for example, improve the return on the investment of advertisers in sponsoring programming and/or content on primary media presentation devices 106 (e.g., television). For example, the example system 100 of FIG. 1 provides media (e.g., advertising) to the secondary media presentation device 104 when advertising media is skipped on the primary media presentation device 106, thereby counteracting the ad skipping phenomenon brought on by DVRs and the like.

The example digital media device 102 of FIG. 1 obtains media (e.g., programs and/or advertising) from media provider(s) 108 and displays the media via the example primary media presentation device 106. For example, the example digital media device 102 may be a digital video recorder (DVR), a personal video recorder (PVR), a digital streaming player (e.g., a Roku, an Apple TV, etc.), a cable and/or satellite set top box, a personal computer, a laptop computer, a tablet computer, a game console, and/or any combination of these or other digital media devices. In some examples, the digital media device 102 and the primary media presentation device 106 are implemented using one device (e.g., a smart television). The example media provider(s) of FIG. 1 may include, for example, cable and/or satellite television operators and/or streaming media services. The example digital media device 102 of FIG. 1 enables recording and time-shifted viewing of media obtained from media providers 108 such as cable and/or satellite television operators.

The example secondary media presentation device 104 of FIG. 1 is a device capable of presenting media to a user associated with the digital media device and/or the primary media presentation device. The example secondary media presentation device 104 of FIG. 1 may be, for example, a mobile device having a form factor sufficiently small to be easily carried, such as a smartphone, a tablet computer (e.g., an iPad), or another computing device having a display screen and communications capabilities. The example secondary media presentation device 104 may be used for general computing tasks such as web browsing and/or word processing, and/or may be used for specific computing tasks, such as tasks defined by an application that can be downloaded from an application store (e.g., via a network 110 such as the Internet). The example secondary media presentation device 104 may connect to the network 110 via a wired and/or wireless network access point 112 (e.g., a wired and/or wireless router, a wired and/or wireless modem, and/or a combination thereof) and/or via a wireless communications connection (e.g., a 2G, EDGE, 3G, WiMax, and/or 4G data communications connection) via a network node 114 of a wireless communications provider.

A user can control the example digital media device 102 of the illustrated example using a remote control device 116. The example remote control device 116 may communicate with the digital media device 102 via infrared frequency transmissions, directly via a wireless data connection (e.g., Bluetooth), and/or via a wired and/or wireless data connection via a network (e.g., a wired and/or wireless local area network (LAN)). Using the remote control device 116, a user may cause the digital media device 102 to, among other things, fast forward through portions of a media presentation that the user does not wish to view. For example, users of a time-shifting media device may choose to fast forward through (or otherwise skip) advertisements when viewing time-shifted media. In such cases, the users do not view or view an abbreviated version of the advertisement(s) between sections of content. Such skipping behavior deprives the advertiser of the effect of the advertisement, and reduces the incentive for an advertiser to invest in advertising. While the example remote control device 116 of FIG. 1 is illustrated as a standalone device, the example remote control device 116 may be integrated into and/or implemented by other hardware and/or software, such as by a remote control application executing on the example secondary media presentation device 104.

To mitigate the effect of skipping advertisements or other media, the example digital media device 102 of FIG. 1 detects when an advertisement is skipped (as opposed to content being skipped) and, when an advertisement skip is detected, causes the secondary media presentation device 104 of FIG. 1 to display the advertisement, a substitute advertisement, or other substitute media to replace or augment the advertisement that was skipped.

To this end, the example system 100 of FIG. 1 includes a media detection server 118 and a supplemental media server 120. The example media detection server 118 of FIG. 1 obtains information describing the media being presented and/or skipped at the digital media device 102. In some examples, the digital media device 102 decodes media identification data, such as watermarks or codes, from the media being presented and/or from media being skipped. Additionally or alternatively, the example media detection server 118 obtains signatures characterizing the media being presented and/or skipped at the digital media device 102. The media detection server 118 compares the codes and/or signatures to a library or database of reference codes and/or signatures to identify matching codes and/or signatures. When matching codes and/or signatures are identified in the reference library, the example media detection server 118 determines whether the matching reference codes and/or signatures correspond to programs, content, advertisements, or other media types of interest.

When the example media detection server 118 determines that media type of interest (e.g., advertising) is being skipped by the user of the digital media device 102, the example supplemental media server 120 of FIG. 1 provides supplemental media (e.g., the skipped advertisement, an alternative advertisement, an advertisement notification, etc.) to the secondary media presentation device 104.

While the example media detection server 118 and the example supplemental media server 120 are disclosed in FIG. 1 as separate systems, media detection (e.g., advertisement and program identification) and/or supplemental media delivery to the secondary media presentation device 104 may be partially or wholly performed via the digital media device 102 of FIG. 1.

Figure 2:
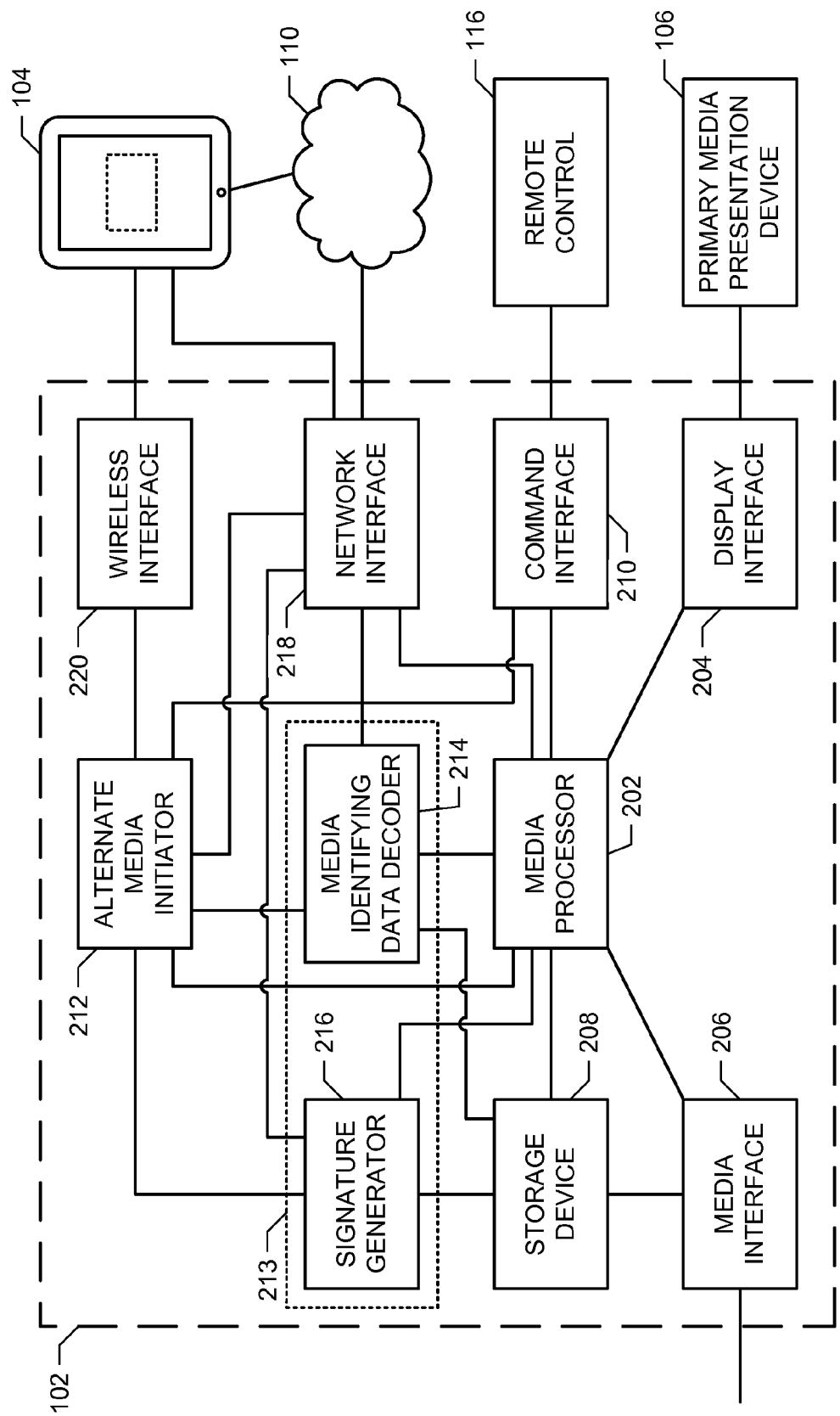
FIG. 2 is a block diagram of an example implementation of the example digital media device of FIG. 1.

FIG. 2 is a more detailed block diagram of the example digital media device 102 of FIG. 1. The example digital media device 102 of FIG. 2 obtains media and displays the media on a media presentation device (e.g., a television or display monitor). The example digital media device 102 of FIG. 2 may further record and store media for time-shifted viewing.

The digital media device 102 of the illustrated example of FIG. 2 includes a media processor 202, a display interface 204, a media interface 206, a storage device 208, and a command interface 210. The example media processor 202 of FIG. 2 processes audio and/or video information (e.g., received media for playback, stored media, interactive content, electronic program guides, user menus, etc.) for display on a media presentation device (e.g., the primary media presentation device 106 of FIG. 1). For example, the media processor 202 of FIG. 2 may decode compressed digital media files and provide the decoded media to the primary media presentation device 104 via the display interface 204. The example display interface 204 of FIG. 2 includes any necessary hardware and/or software to interface the media processor 202 to the primary media presentation device 104, such as physical port connections, rendering hardware and/or software, and/or signaling hardware and/or software, among other things. An example display interface 204 is a High-Definition Multimedia Interface (HDMI) communications interface.

The example media processor 202 receives media via the media interface 206 (e.g., from the media provider(s) 108 of FIG. 1). The example media interface 206 may include a cable connection, satellite connection, fiber optic connection, wired and/or wireless Internet connection, and/or any other method of receiving media from the media provider(s) 108.

In addition to presenting media via the display interface 204, the example media processor 202 of FIG. 2 may record and/or store media (e.g., at the direction of a user of the digital media device 102) in the storage device 208. The example storage device 208 of FIG. 2 is a mass storage device such as a hard disk drive, a solid state drive, and/or any other type of non volatile storage. In some examples, the storage device 208 is remote from the digital media device 102 and communicatively connected to the digital media device 102 to receive, store, deliver and/or present media via the media processor 202. At the direction of the user (e.g., via the command interface 210), the example media processor 202 accesses recorded media stored on the storage device 208 and presents the recorded media via the display interface 204. The presentation of time-shifted media (e.g., media that is played back at a time subsequent to its initial or intended presentation) may be manipulated by the user, including playing the media, stopping playback of the media, pausing playback of the media, fast forwarding the media, and/or rewinding the media, among other things.

The example command interface 210 of FIG. 2 receives command signals from the example remote control 116. For example, the command interface may include an IR frequency receiver and a decoder to decode signals transmitted to the command interface 210 by the remote control device 116. In some examples, the remote control device 116 communicates with the digital media device 102 via a data signal, such as a wired and/or wireless LAN, a Bluetooth connection, and/or any other data communication. Additionally or alternatively, the example command interface 210 of FIG. 2 may include one or more physical buttons to command the digital media device 102 to play media, stop playing media, pause media, fast forward media, rewind media, change channels, and/or any other command.

The example digital media device 102 of FIG. 2 enables a user of the digital media device 102 to play time-shifted media on the primary media presentation device 106 and to fast forward the time-shifted media to skip portions of the time-shifted media (e.g., instead of presenting them on the primary media presentation device 106 or by presenting them at a very high speed). As mentioned above, enabling fast forwarding of advertisements reduces a return on investment for purchasers of advertising during a program. To mitigate this effect, the example digital media device 102 of FIG. 1 is associated with one or more secondary media presentation devices (e.g., the device 104 of FIG. 2) for delivery and presentation of media in response to media of interest (e.g., advertisements) being skipped via the digital media device 102. In other words, the example digital media device 102 causes substitute media to be presented on the example secondary media presentation device 104. Substitute media may include, for example, a substitute commercial, a coupon, an advertiser and/or product web page, and/or any other media designed to incentivize the user of the secondary media presentation device 104 to view the advertisement.

To detect skipping of advertisements and/or to initiate presentation of media via the secondary media presentation device 104, the example digital media device 102 of FIG. 1 includes an alternate media initiator 212, a media detector 213 including a media identifying data decoder 214 and a signature generator 216, a network interface 218, and a wireless interface 220. The example alternate media initiator 212 of FIG. 2 initiates the presentation of media to the example secondary media presentation device 104 in response to identifying that media of interest is being and/or has been skipped.

The example media detector 213 of FIG. 2 determines that a portion of media being presented and/or skipped includes an advertisement or other media of interest by obtaining codes and/or signatures from the media. Identification codes, such as watermarks, ancillary codes, etc. may be embedded within or otherwise transmitted with media signals. Identification codes are data that are inserted into media (e.g., audio) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of one or more characteristic(s) of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety. Codes, metadata, signatures, etc. collected and/or generated by the media identifying data decoder 214 and/or signature generator 216 of FIG. 2 for use in identifying media and/or a station transmitting media may be referred to generally as media monitoring data or media identifying data.

Figure 3:
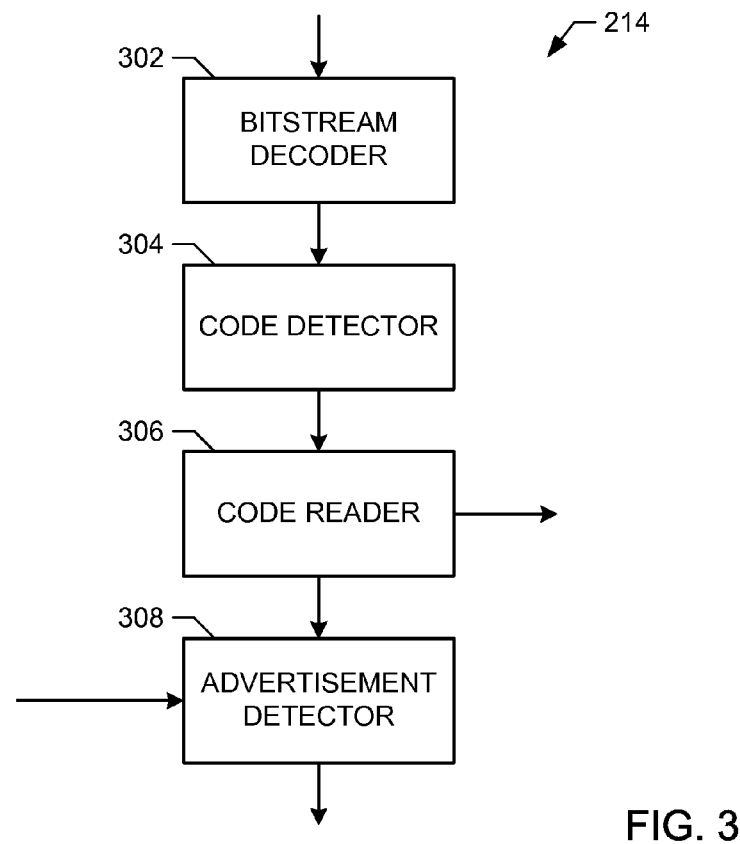
FIG. 3 is a block diagram of an example implementation of the example media identifying data decoder of FIG. 2.

The example media identifying data decoder 214 of FIG. 1 obtains all or a portion of media (e.g., an audio portion, a video portion, or both) from which media identifying data is to be decoded. FIG. 3 is a more detailed block diagram of the example media identifying data decoder 214 of FIG. 2. As illustrated in FIG. 3, the example media identifying data decoder 214 includes a bitstream decoder 302, a code detector 304, a code reader 306, and an advertisement detector 308.

Example media identifying data includes codes or watermarks that are embedded into audio or video data of media. The media identifying data may be encoded steganographically in the audio for, for example, audience measurement or research purposes. In some examples, the decoded media identifying data provides information about the media in which the data is embedded, such as a time at which the media was originally presented or intended for presentation (e.g., via a broadcast), an identification of the media (e.g., a program identifier, an owner identifier, a station identifier, a network identifier, an advertiser identifier, etc.), a characteristic of the media (e.g., the media is a program, the media is an advertisement, etc.), and/or any other information pertaining to presentation of the media. In some examples, the media identifying data is repeated for the duration of the media and/or changes between different portions of the media. For example, the program content portion of media may include a first set of one or more codes describing the program content and each of one or more advertisement(s) presented between portions of the program content include respective set(s) of one or more codes describing the advertisement(s).

The example media identifying data decoder 214 of FIG. 2 decodes (e.g., extracts) any and/or all media identifying data from the media being presented for identification of the media and/or characteristics of the media. In some examples, the example media identifying data decoder 214 accesses a file stored in the storage device 208 containing recorded media data and extracts media identifying data from the stored file. Thus, the example media identifying data decoder 214 may decode or extract media identifying data from media that was skipped (e.g., not fully processed by the example media processor 202). To extract media identifying data from skipped media, the example media identifying data decoder 214 determines or receives (e.g., from the media processor 202) an indication of the beginning and ending times of the portion of the media that was skipped. In the example of FIG. 2, the beginning and ending times are determined with reference to the beginning of the media (e.g., the start of the media file is considered to be time 0:00.00). The example media identifying data decoder 214 provides the extracted media identifying data to the alternate media initiator 212 and/or to an external media detection server 118 via the example network interface 218 and/or the network 110.

In addition to or as an alternative to decoding media identifying data encoded in the media, the example digital media device 102 of FIG. 2 includes a signature generator 216 to generate signature(s) characteristic of the media being presented (e.g., via the media processor 202) and/or the media stored in the storage device 208. The example signature generator 216 generates signatures which describe (e.g., uniquely describe, nearly-uniquely describe) the portion of the audio being characterized (e.g., a block of audio having a length of time).

The example signature generator 216 of FIG. 2 transmits generated signatures via the example network interface 218 and the example network 110 of FIG. 2 to a signature matching server (e.g., the media detection server 118 of FIG. 1). The example media detection server 118 may compare one or more of the signature(s) to reference signatures in a reference library. The reference signatures are representative of media to which the media presented by, and/or stored on, the digital media device 102 can be matched. If the example media detection server 118 detects a match, the example media detection server 118 may determine whether the matching media is media of interest (e.g., an advertisement). If the matching media is media of interest, the example media detection server 118 sends an indication of the media of interest to the example digital media device 102 (e.g., to the alternate media indicator 212) and/or to a supplemental content server (e.g., the supplemental media server 120 of FIG. 1).

Figure 4:
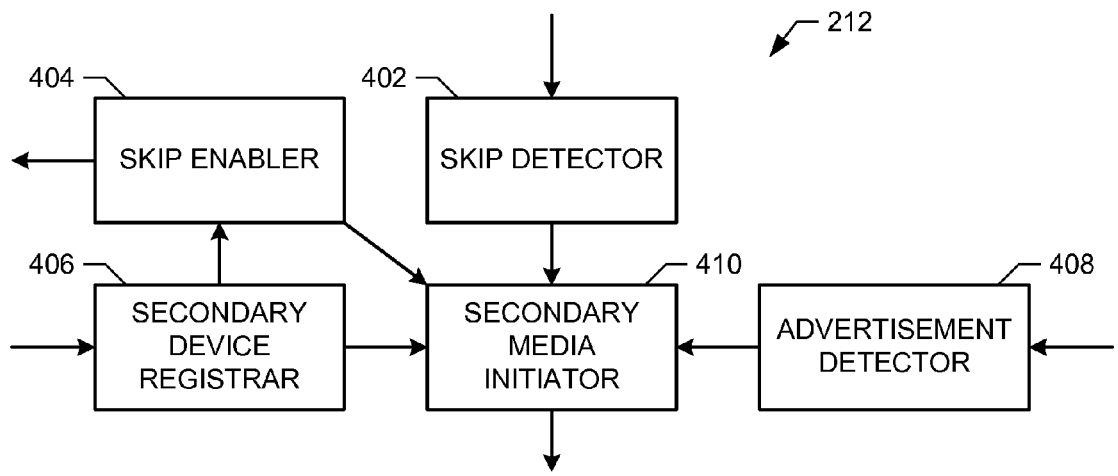
FIG. 4 is a block diagram of an example implementation of the example alternate media initiator of FIG. 2.

FIG. 4 is a block diagram of an example implementation of the example alternate media initiator 212 of FIG. 2. As illustrated in FIG. 4, the example alternate media initiator 212 includes a skip detector 402, a skip enabler 404, a secondary device registrar 406, an advertisement detector 408, and a secondary media initiator 410.

The example skip detector 402 of FIG. 4 detects skipping of media (which may or may not be media of interest) based on, for example, receiving a fast forward, channel change, or skip command from the example command interface 210. To determine whether skipped media is media of interest (e.g., an advertisement) and not other media (e.g., program content), the example skip detector 402 receives media identifying data from the skipped media (e.g., codes embedded in the media, signatures of the skipped media (e.g., hashes of the media), and/or metadata providing an indication of the nature of the skipped media (e.g., media of interest, not media of interest, an identification of the media, etc.)) from an external server such as the media detection server 118 of FIG. 1.

The example skip enabler 404 of FIG. 4 may enable and/or disable skipping of media of interest (e.g., advertisements) based on, for example, whether a secondary media presentation device is registered to the digital media device 102 (e.g., via the secondary device registrar 406) and/or to another location. For example, the skip enabler 404 may disable skipping of advertising via the digital media device 102 until a user agrees to view supplemental media (e.g., substitute ads) on one or more secondary media presentation devices 104 and/or until the presences of a secondary media presentation device configured to receive such supplemental media is detected. To disable skipping, the example skip enabler 404 of the illustrated example obtains an indication of whether media is media of interest (e.g., media that is not to be skipped) when a skip (e.g., fast forward) command is received via the command interface 210 of FIG. 2.

If the skip enabler 404 of the illustrated example determines that media of interest would be skipped, the example skip enabler 404 suppresses the skip command via the command interface 210. The example skip enabler 404 further causes the example media processor 202 of FIG. 2 to present a suppression notification to the user via the display interface 204 and the primary media presentation device 106. An example suppression notification may inform the user that skipping advertisements is not permitted until a secondary media presentation device is registered (e.g., communicatively connected) to the digital media device 102 via the secondary device registrar 406.

Figure 5B:
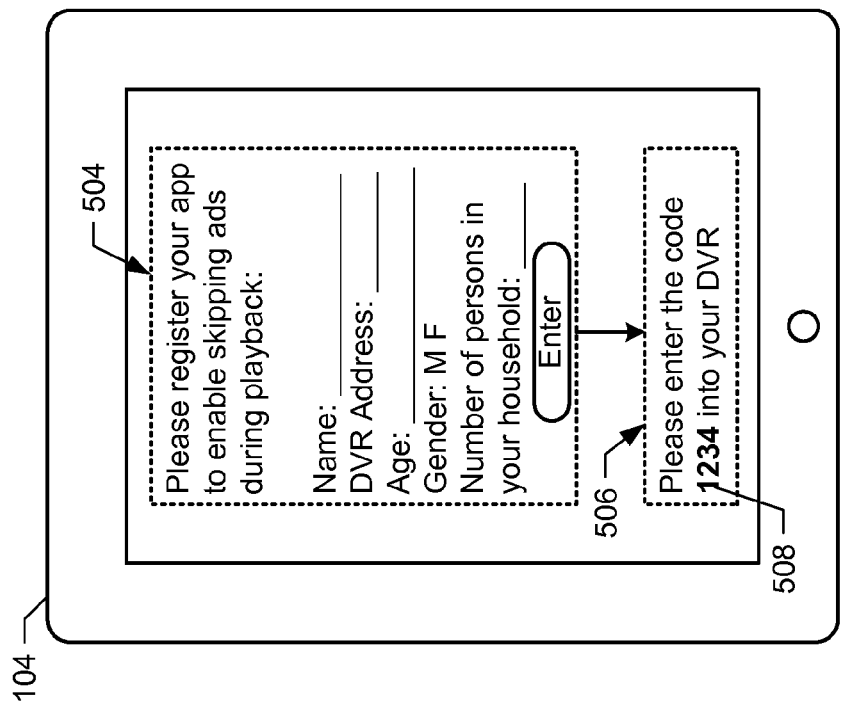
FIG. 5B illustrates an example user interface constructed in accordance with the teachings of this disclosure and displayed via a secondary media presentation device to associate the secondary media presentation device with a digital media device.
Figure 5A:
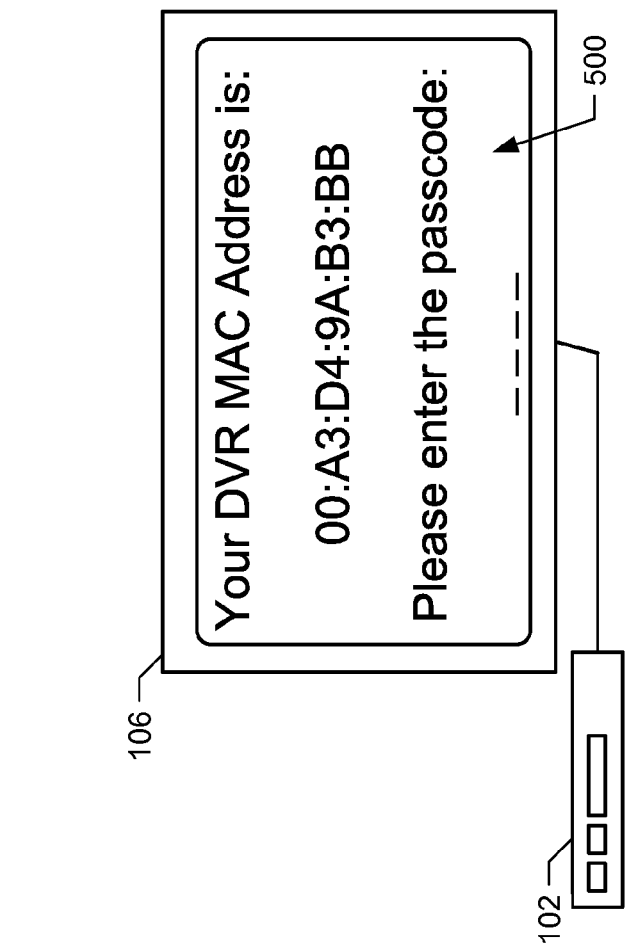
FIG. 5A illustrates an example user interface constructed in accordance with the teachings of this disclosure and displayed via a digital media device and a primary media presentation device to enable skipping of media via the digital media device.

To register the example secondary media presentation device 104, the example secondary device registrar 406 presents an address or identifier (e.g., a media access control (MAC) address, an Internet protocol (IP) address, an ad hoc network identifier, a subnet, etc.) of the example digital media device 102 (e.g., of the network interface 218 and/or the wireless interface 220 of FIG. 2) via the display interface 204 and the primary media presentation device 106. FIG. 5A illustrates an example user interface 500 displayed via the digital media device 102 and the example primary media presentation device 104 of FIGS. 1 and 2 to enable skipping of media via the digital media device 102. The example user interface of FIG. 5A provides identification information (e.g., a MAC address of the digital media device 102) that may be used to establish a connection, and requests a passcode to verify the secondary media presentation device 104 attempting to connect is genuine (e.g., associated with the user of the digital media device 102).

The example secondary device registrar 406 may further direct the user (e.g., via the display interface 204 and the primary media presentation device 106) to download an application or otherwise configure the secondary media presentation device 104 to be registered to the digital media device 102. FIG. 5B illustrates an example user interface 502 displayed via the example secondary media presentation device 104 of FIG. 2 to associate the secondary media presentation device 104 with the digital media device 102.

Once downloaded or otherwise executed on the example secondary media presentation device 104, the example secondary media presentation device 104 may request (e.g., via an interface 504) information to identify the digital media device 102 (e.g., the MAC address), personal information, demographic information, and/or any other information to be entered into the secondary media presentation device 104 by the user. When the secondary media presentation device 104 has obtained the identification of the digital media device 102 (e.g., the MAC address), the example secondary media presentation device 104 establishes a communications connection with the digital media device 102 (e.g., a Bluetooth connection and/or ad hoc wireless connection via the wireless interface 220, a wired and/or wireless LAN connection via the network interface 218, etc.) to communicate with the secondary device registrar 406. When the communications connection is established, the example secondary device registrar 406 transmits a passcode 506 or other confirmation identifier to the example secondary media presentation device 104, which the secondary media presentation device 104 displays to the user via an interface 508. The example user inputs the passcode into the secondary device registrar 406 (e.g., via the remote control 116 and the command interface 210 of FIG. 2).

In some examples, subsequent to enabling skipping of media of interest, the example skip enabler 404 of FIG. 4 may temporarily suspend or disable skipping in response to determining that a connection between the digital media device 102 and the secondary media presentation device 104 has been lost for a threshold period of time. Prior to suspending or disabling skipping, the example skip enabler 404 may provide warnings to the user (e.g., via the display interface 204 and the primary media presentation device 106) of the digital media device 102 that the connection to the registered secondary media presentation device 104 has been lost and that skipping privileges may be suspended if the connection is not reestablished.

On the other hand, if the media to be skipped is not media of interest (e.g., the user wishes to fast forward through program content), the example skip enabler 404 may permit the fast forwarding to occur and stop the fast forwarding when media of interest would be skipped.

When the user has complied with one or more requirements for enabling skipping of media, such as downloading a designated application to the secondary media presentation device 104, initiated a connection between the digital media device 102 and the secondary media presentation device 104, and/or provided registration information such as personal and/or demographic information, the example skip enabler 404 of FIG. 4 enables skipping of media via the command interface 210.

To detect whether media to be skipped is media of interest (e.g., an advertisement), the example alternate media initiator 212 of FIG. 4 includes an advertisement detector 408. The example advertisement detector 408 receives media identifying data (e.g., from the media identifying data detector 214 of FIGS. 2 and/or 3), such as codes, signatures (e.g., from the signature generator 216 of FIG. 2), and/or metadata indications of whether media is media of interest (e.g., from the media detection server 118 via the network 110 and the network interface 218 of FIGS. 1 and 2). The example advertisement detector 408 may interpret and/or identify codes (e.g., advertisement flags, program flags, media identifier codes, etc.) to determine whether media to be skipped is media of interest. Additionally or alternatively, the example advertisement detector 408 may compare the codes and/or generated signatures to reference codes and/or reference signatures (e.g., stored in the storage device 208) to identify media having matching codes and/or signatures. Accordingly, the example advertisement detector 408 may implement all or part of the example media detection server 118 of FIG. 1.

The example secondary media initiator 410 of FIG. 4 initiates the delivery of media to and/or presentation of media on the example secondary media presentation device 104 of FIGS. 1 and/or 2. For example, the secondary media initiator 410 receives an indication of a skip request, determines whether skipping is enabled (e.g., for some or all media types), and determines whether the media to be skipped is media of interest (e.g., an advertisement). If media of interest is to be skipped, the example secondary media initiator 410 initiates the presentation of media on the secondary media presentation device 104.

In some examples, the secondary media initiator 410 transmits the media being skipped and/or substitute media to the example secondary media presentation device 104 via the wireless interface 220 and/or via the network interface 218. Additionally or alternatively, the example secondary media initiator 410 transmits a notification and/or an identification of the secondary media presentation device 104 to a supplemental media server (e.g., the supplemental media server 120 via the network interface 218 of FIGS. 1 and/or 2). In response to the notification and/or an identification, the example supplemental media server 120 transmits the media and/or substitute media to the secondary media presentation device 104. In some other examples, the secondary media initiator 410 of FIG. 4 transmits a notification and/or identification of supplemental media to be delivered to the example secondary media presentation device 104. The identification of the supplemental media may be based on, for example, a characteristic of the media being skipped (e.g., the advertiser, the network showing the program, etc.). Upon receipt of the notification and/or identification, the example secondary media presentation device 104 retrieves supplemental media (e.g., from the supplemental media server 120 of FIG. 1).

The example secondary media initiator 410 may cause supplemental media to be presented via the secondary media presentation device 104 that is proportional to the media that is skipped. For example, the secondary media initiator 410 may cause twice as many advertisements or offers to be displayed via the secondary media initiator 410 when two advertisements are skipped on the digital media device 102 than when one ad is skipped on the digital media device 102.

Figure 6:
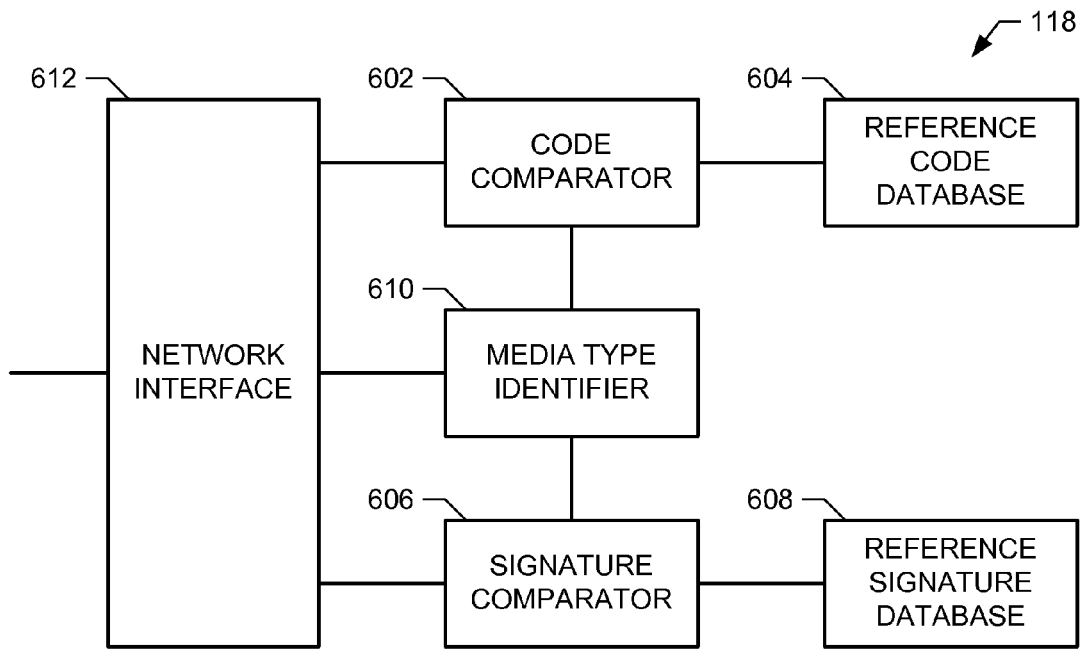
FIG. 6 is a block diagram of an example implementation of the example media detection server of FIG. 1.

FIG. 6 is a more detailed block diagram of the example media detection server 118 of FIG. 1. The example media detection server 118 of FIG. 1 may be implemented as one or more separate servers and/or may be implemented in the example digital media device 102 of FIGS. 1 and/or 2. The example media detection server 118 of FIG. 6 includes a code comparator 602, a reference code database 604, a signature comparator 606, a reference signature database 608, a media type identifier 610, and a network interface 612.

The example code comparator 602 of FIG. 6 obtains codes to be identified (e.g., from the media identifying data decoder 214 of FIG. 2 via the network interface 612). To identify received code(s), the example code comparator 602 of FIG. 6 compares the received code(s) with reference codes stored in the reference code database 604. The reference codes may be stored in the reference code database 604 in association with information describing the meaning of the codes, such as an identification of media (e.g., the corresponding content and/or advertisement), an identification of a program, an identification of an advertiser, a type of the media (e.g., content, advertisement, etc.), an identification of a channel, an identification of a time, an identification of a geographic area, an identification of an owner of the media, and/or any other information that may be embedded into media.

The precise methodologies and/or structures of the media identifying data decoder 214 of FIG. 2 or the code comparator 602 FIG. 6 are irrelevant to this disclosure. Example methods of encoding media identifying codes in media and/or decoding codes embedded in media are described in U.S. Pat. No. 5,481,294 among others. When the code comparator 602 identifies a matching code in the reference code database 604, the example code comparator 602 provides the corresponding information to the example media type identifier 610.

The example signature comparator 606 of FIG. 6 obtains signatures to be matched to reference signatures (e.g., from the signature generator 216 of FIG. 2 via the network interface 612). To identify received signature(s), the example signature comparator 606 of FIG. 6 compares the received signatures(s) with reference signatures stored in the reference signature database 608. The reference signatures may be stored in the reference signature database 608 in association with information describing the media from which the reference signatures were previously derived, including a name of the media, a type of the media (e.g., program, content, advertisement, etc.), an advertiser, an owner, and/or any other identifying information regarding the reference media. The example signature comparator 606 determines whether a signature is a match based on the method used to generate the signatures. Different methods of generating signatures correspond to different methods of comparing signatures and determining matches between signatures. The precise methodologies and/or structures of the signature generator 216 of FIG. 2 or the signature comparator 606 FIG. 6 are irrelevant to this disclosure. Example methods of generating and/or comparing signatures of media are described in U.S. Pat. No. 5,481,294, among others.

The example media type identifier 610 of FIG. 6 obtains identifications of media from the comparators 602, 606 and corresponding information obtained from the databases 604, 608 for the identified media. Based on the information, the example media type identifier 610 determines whether the identified media is media of interest (e.g., an advertisement). When the identified media is media of interest (e.g., an advertisement), the example media type identifier 610 sends an indication that the media is media of interest to the example supplemental media server 120, the example digital media device 102, and/or to the example secondary media presentation device 104. The identification of the media as media of interest may then be used to present supplemental (e.g., substitute) media on the secondary media presentation device 104 and/or to suppress skipping of media.

Figure 7:
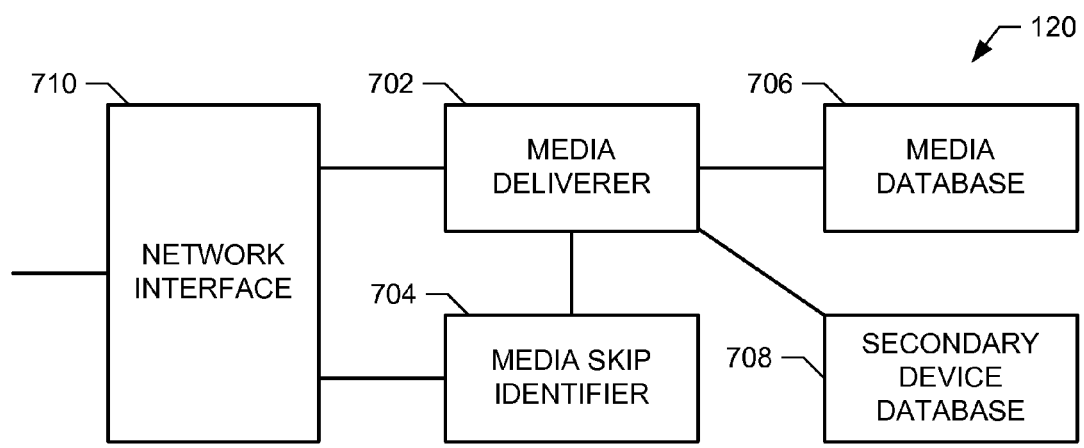
FIG. 7 is a block diagram of an example implementation of the example supplemental media server of FIG. 1.

FIG. 7 is a block diagram of an example implementation of the example supplemental media server 120 of FIG. 1. The example supplemental media server 120 of FIGS. 1 and/or 7 may be implemented as one or more separate servers, may be combined with the example media detection server 118, and/or may be implemented in the example digital media device 102 of FIGS. 1 and/or 2. The example supplemental media server 120 of FIG. 7 includes a media deliverer 702, a media skip identifier 704, a media database 706, a secondary device database 708, and a network interface 710.

The example media deliverer 702 of FIG. 7 delivers supplemental or substitute media to a secondary media presentation device (e.g., the secondary media presentation device 104 of FIGS. 1 and/or 2) via the network interface 710. In the example of FIG. 7, the media deliverer 702 delivers the supplemental media in response to receiving an indication that media of interest is being skipped (e.g., via the digital media device 102 and/or the media detection server 118 of FIGS. 1 and/or 2). For example, when the media skip identifier 704 receives an indication from the digital media device 102 that media has been skipped and the media deliverer 702 receives an indication from the digital media device 102 and/or from the media detection server 118 that the media is media of interest, the example media deliverer 702 determines supplemental media to be sent and determines a destination for the supplemental media.

The example media deliverer 702 selects media from the media database 706 for delivery to the example secondary media presentation device 104. The example media deliverer 702 further determines an identity and/or a location (e.g., an address) at which media can be provided to the secondary media presentation device 104. The example media deliverer 702 transmits the selected media to the secondary media presentation device 104 at the identified address or location.

Figure 8:
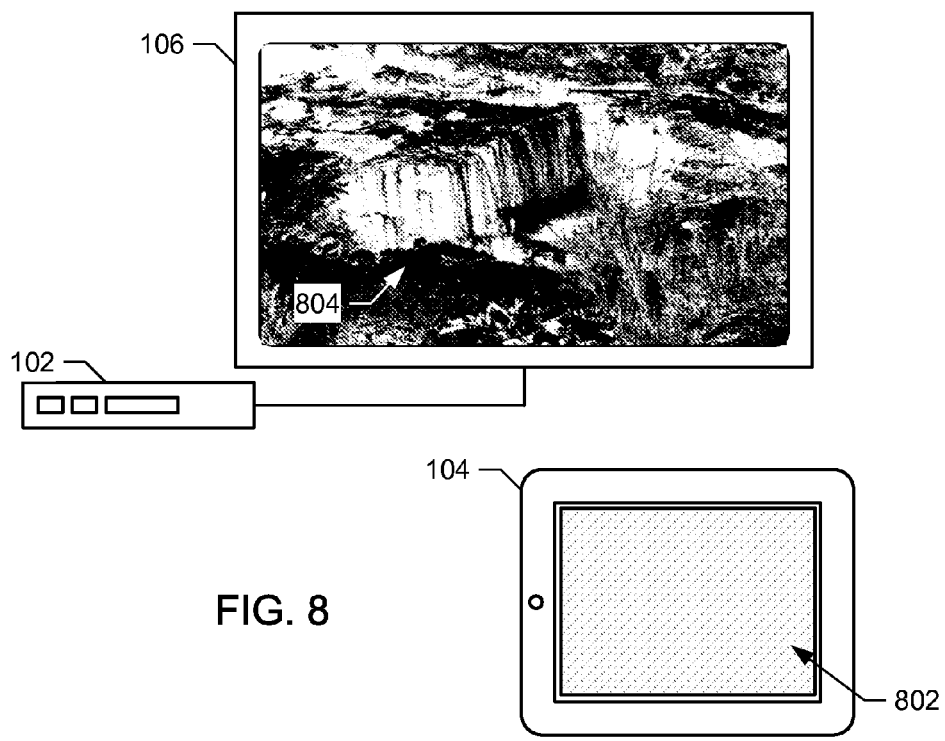
FIG. 8 illustrates an example of presenting media via a primary media presentation device and a digital media device, the digital media device being associated with a secondary media presentation device.

FIG. 8 illustrates an example of presenting media via the example primary media presentation device 106 and the example digital media device 102 of FIG. 1. In the example of FIG. 8, the digital media device 102 is associated (e.g., registered, communicatively connected) with the secondary media presentation device 104. The example secondary media presentation device 104 includes an application 802 to communicate with the example digital media device 102 via a network or direct wireless data connection. While the primary media presentation device 106 displays program content 804, the example application 802 of FIG. 8 on the secondary media presentation device 104 does not present supplemental media, and the user may use the device 104 to skip the media without restriction.

Figure 9:
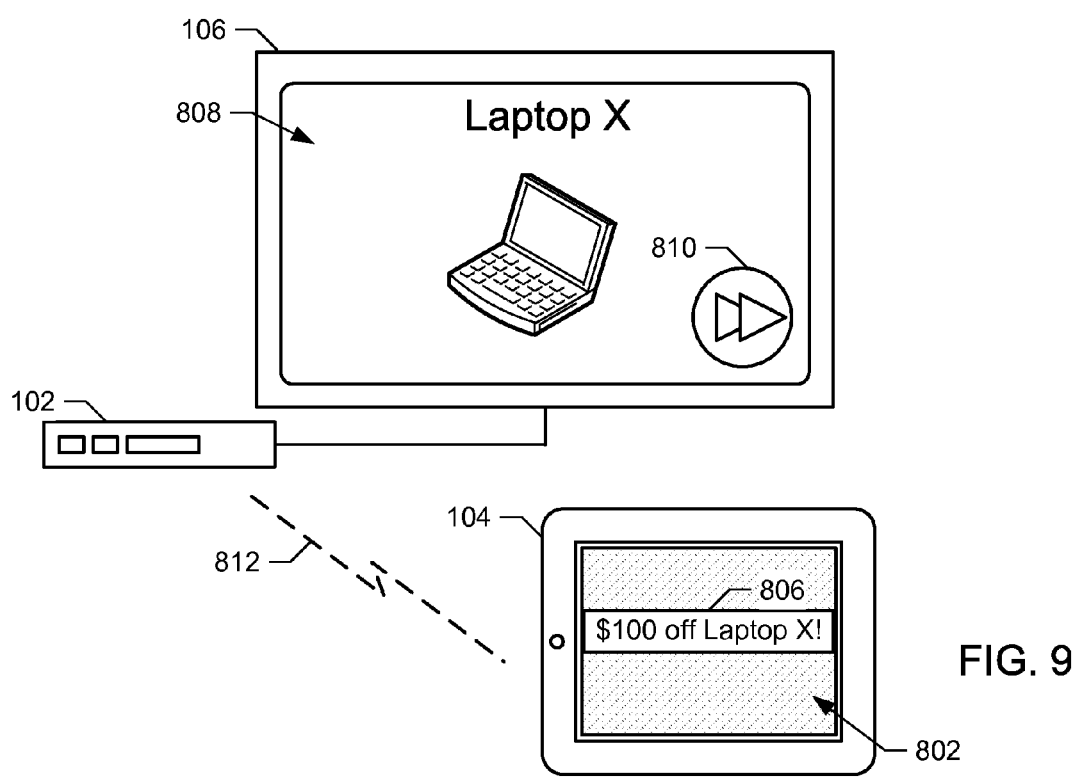
FIG. 9 illustrates an example of presenting media via the secondary media presentation device of FIG. 8 when the digital media device detects a command to skip media being presented on the primary media presentation device of FIG. 8.

FIG. 9 illustrates an example of presenting supplemental media 806 via the secondary media presentation device 104 of FIG. 8 when the digital media device 102 detects a command to skip media 808 being presented on the primary media presentation device 106 of FIG. 8. In the example of FIG. 9, the user has sent a command to the example digital media device 102 to cause the digital media device 102 to skip (e.g., fast forward) the media 808 being shown on the primary media presentation device 106, which is illustrated in FIG. 9 as a fast forward symbol 810 displayed the user on the primary media presentation device 106.

In response to the skipping, the example digital media device 102 transmits a signal 812 or other notification to the example secondary media presentation device 104. The signal 812 include a location from which the example application 802 is to retrieve supplemental media for display on the secondary media presentation device 104. The example application 802 executing on the secondary media presentation device 104 receives the example signal 812, requests the supplemental media based on the signal 812, and displays the media 806 (e.g., a supplemental advertisement) on the secondary media presentation device 104. While the example application 802 of FIG. 9 is depicted showing a single advertisement, the example media 806 may include multiple advertisements, offers, or other media in succession and/or simultaneously.

While an example manner of implementing the system 100 of FIG. 1 is illustrated in FIGS. 1, 2, 3, 4, 6, and/or 7, one or more of the elements, processes and/or devices illustrated in FIGS. 1, 2, 3, 4, 6, and/or 7 may be combined, divided, re-arranged, omitted, eliminated and/or implemented in any other way. Further, the example digital media device 102, the example secondary media presentation device 104, the example primary media presentation device 106, the example media provider(s) 108, the example network access point 112, the example remote control 116, the example media detection server 118, the example supplemental media server 120, the example media processor 202, the example display interface 204, the example media interface 206, the example storage device 208, the example command interface 210, the example alternate media initiator 212, the example media identifying data decoder 214, the example signature generator 216, the example network interfaces 218, 612, 710, and the example wireless interface 220, the example bitstream decoder 302, the example code detector 304, the example code reader 306, the example advertisement detector 308, the example skip detector 402, the example skip enabler, the example secondary device registrar 406, the example advertisement detector 408, the example secondary media initiator 410, the example code comparator 602, the example reference code database 604, the example signature comparator 606, the example reference signature database 608, the example media type identifier 610, the example media deliverer 702, the example media skip identifier 704, the example media database 706, the example secondary device database 708 and/or, more generally, the example system 100 of FIG. 1 may be implemented by hardware, software, firmware and/or any combination of hardware, software and/or firmware. Thus, for example, any of the example digital media device 102, the example secondary media presentation device 104, the example primary media presentation device 106, the example media provider(s) 108, the example network access point 112, the example remote control 116, the example media detection server 118, the example supplemental media server 120, the example media processor 202, the example display interface 204, the example media interface 206, the example storage device 208, the example command interface 210, the example alternate media initiator 212, the example media identifying data decoder 214, the example signature generator 216, the example network interfaces 218, 612, 710, and the example wireless interface 220, the example bitstream decoder 302, the example code detector 304, the example code reader 306, the example advertisement detector 308, the example skip detector 402, the example skip enabler, the example secondary device registrar 406, the example advertisement detector 408, the example secondary media initiator 410, the example code comparator 602, the example reference code database 604, the example signature comparator 606, the example reference signature database 608, the example media type identifier 610, the example media deliverer 702, the example media skip identifier 704, the example media database 706, the example secondary device database 708 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, digital media device 102, the example secondary media presentation device 104, the example primary media presentation device 106, the example media provider(s) 108, the example network access point 112, the example remote control 116, the example media detection server 118, the example supplemental media server 120, the example media processor 202, the example display interface 204, the example media interface 206, the example storage device 208, the example command interface 210, the example alternate media initiator 212, the example media identifying data decoder 214, the example signature generator 216, the example network interfaces 218, 612, 710, and the example wireless interface 220, the example bitstream decoder 302, the example code detector 304, the example code reader 306, the example advertisement detector 308, the example skip detector 402, the example skip enabler, the example secondary device registrar 406, the example advertisement detector 408, the example secondary media initiator 410, the example code comparator 602, the example reference code database 604, the example signature comparator 606, the example reference signature database 608, the example media type identifier 610, the example media deliverer 702, the example media skip identifier 704, the example media database 706, and/or the example secondary device database 708 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIGS. 1, 2, 3, 4, 6, and/or 7, and/or may include more than one of any or all of the illustrated elements, processes and devices.

Flowcharts representative of example machine readable instructions for implementing the system 100 of FIG. 1 are shown in FIGS. 10, 11A-11B, 12, 13, and 14. In these examples, the machine readable instructions comprise programs for execution by a processor such as the processor 1512 shown in the example processor platform 1500 discussed below in connection with FIG. 15. The programs may be embodied in software stored on a tangible computer readable storage medium such as a CD-ROM, a floppy disk, a hard drive, a digital versatile disk (DVD), a Blu-ray disk, or a memory associated with the processor 1512, but the entire programs and/or parts thereof could alternatively be executed by a device other than the processor 1512 and/or embodied in firmware or dedicated hardware. Further, although the example programs are described with reference to the flowcharts illustrated in FIGS. 10, 11A-11B, 12, 13, and 14, many other methods of implementing the example system 100 may alternatively be used. For example, the order of execution of the blocks may be changed, and/or some of the blocks described may be changed, eliminated, or combined.

As mentioned above, the example processes of FIGS. 10, 11A-11B, 12, 13, and 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 10, 11A-11B, 12, 13, and 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 10:
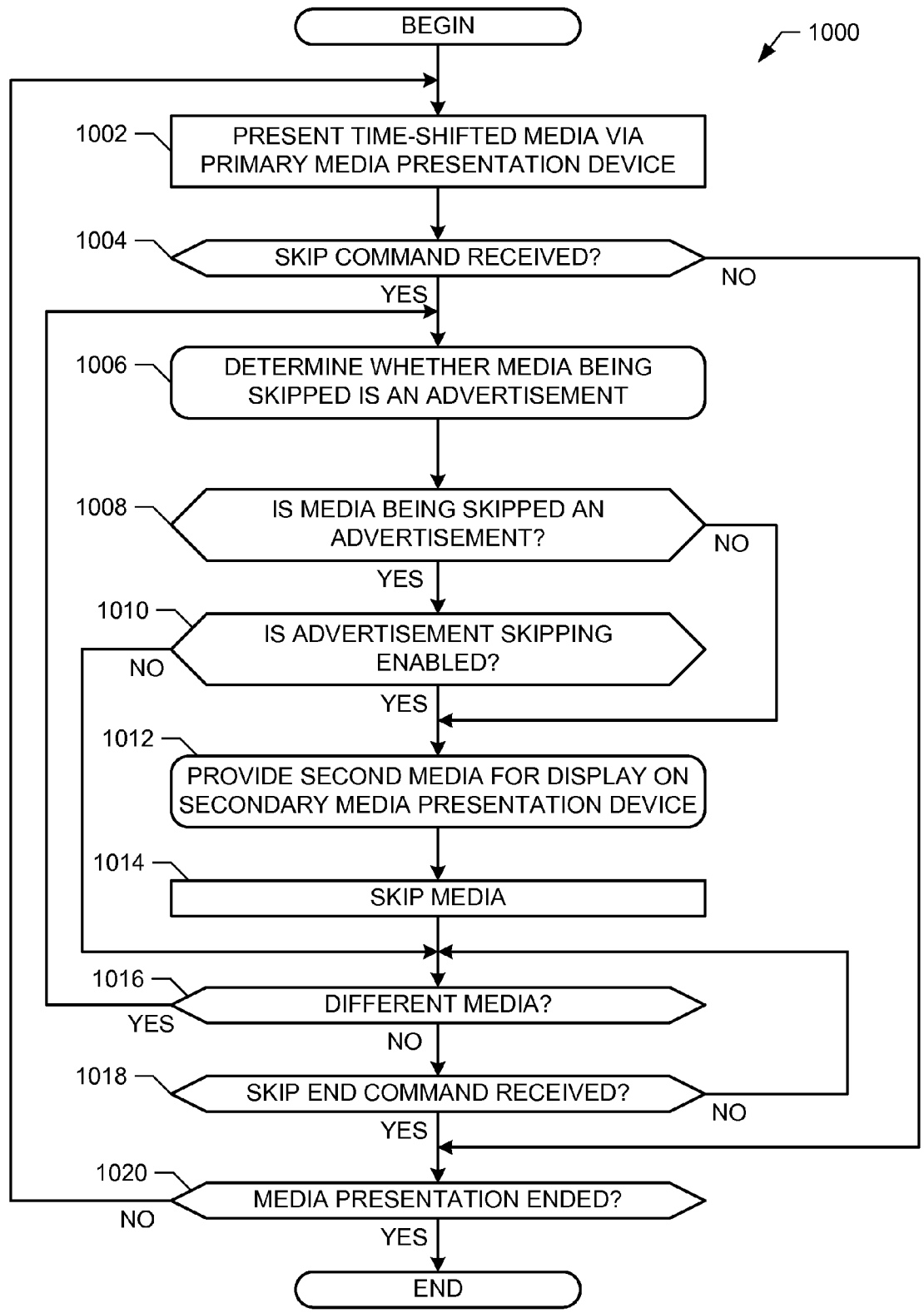
FIG. 10 is a flowchart representative of example machine readable instructions which may be executed to implement the example digital media device, the example media processor, the example display interface, the example storage device, the example command interface, the example alternate media initiator, the example media identifying data decoder, the example signature generator, and the example skip detector of FIGS. 1, 2, and/or 4 to cause media to be displayed via a secondary media presentation device.

FIG. 10 is a flowchart representative of example machine readable instructions 1000 which may be executed to implement the example digital media device 102, the example media processor 202, the example display interface 204, the example storage device 208, the example command interface 210, the example alternate media initiator 212, the example media identifying data decoder 214, the example signature generator 216, and the example skip detector 402 of FIGS. 1, 2, and/or 4 to cause media to be displayed via a secondary media presentation device. The example instructions 1000 of FIG. 10 may be executed to implement the example digital media device 102 of FIGS. 1 and/or 2.

The example digital media device 102 of FIG. 2 presents (e.g., via the media processor 202, the display interface 204, and/or the storage device 208 of FIG. 2) time-shifted media via a primary media presentation device (e.g., the primary media presentation device 106 of FIGS. 1 and/or 2) (block 1002). The example media processor 202 determines whether a skip command has been received (e.g., via the command interface 210) (block 1004). If a skip command has not been received (block 1004), control returns to block 1002 to continue presenting media.

When a skip command is received (block 1004), the example media identifying data decoder 214, the example signature generator 216, and/or the example alternate media initiator 212 of FIG. 2 determine whether the media being skipped is an advertisement (block 1006). For example, the media identifying data decoder 214 may decode one or more codes from the media being skipped and/or the signature generator 216 may generate one or more signatures of the media being skipped. Based on the codes and/or signatures, the example alternate media initiator 212 may determine and/or receive an indication of whether the media being skipped is an advertisement (or other media of interest).

If the media being skipped is an advertisement (block 1008) the example alternate media initiator 212 determines (e.g., via the skip enabler 404 and/or the secondary device registrar 406 of FIG. 4) whether advertisement skipping is enabled (block 1010). For example, the secondary device registrar 406 may determine that advertisement skipping is enabled if a secondary media presentation device 104 is registered and communicatively connected to the example digital media device 102. If advertisement skipping is enabled (block 1010), or if the media being skipped is not an advertisement (block 1008), the example digital media device 102 provides second media (e.g., via the secondary media initiator 410 of FIG. 4) for display on the secondary media presentation device 104 (block 1012). For example, the secondary media initiator 410 may transmit a notification, identification of media, media, and/or any other signal or data to the example secondary media presentation device 104 to cause the secondary media presentation device 104 to display supplemental media. The example digital media device 102 then skips (e.g., fast forwards) the media (block 1014).

After skipping the media (block 1014), or if advertisement skipping is not enabled (block 1010), the example digital media device 102 determines whether different media is being skipped (block 1016). For example, the media identifying data decoder 214, the signature generator 216, and/or the alternate media initiator 212 of FIG. 2 may detect that the media has changed since the previous media was identified. For example, if an advertisement being presented and/or skipped ends and another advertisement and/or the program begins, a difference in the data embedded in the media and/or a set of signatures corresponding to different media may be identified. However, other methods of detecting a transition between media may also be used.

If different media is detected (block 1016), control returns to block 1006 to determine whether the media being skipped is an advertisement. If different media is not detected (block 1016), the example digital media device 102 determines whether a skip end command has been received (e.g., via the skip detector 402 and/or the command interface 210 of FIGS. 2 and/or 4) (block 1018). If a skip end command has not been received (block 1018), control returns to block 1016 to determine whether different media is detected.

When a skip end command is received (block 1018), or if no skip command is received (block 1004), the example digital media device 102 determines whether the media presentation has ended (e.g., via the media processor 202) (block 1020). If the media presentation has not ended (block 1020), control returns to block 1002 to present media. When the media presentation has ended (block 1020), the example instructions 1000 may end and/or iterate for a subsequent media presentation.

Figure 11A:
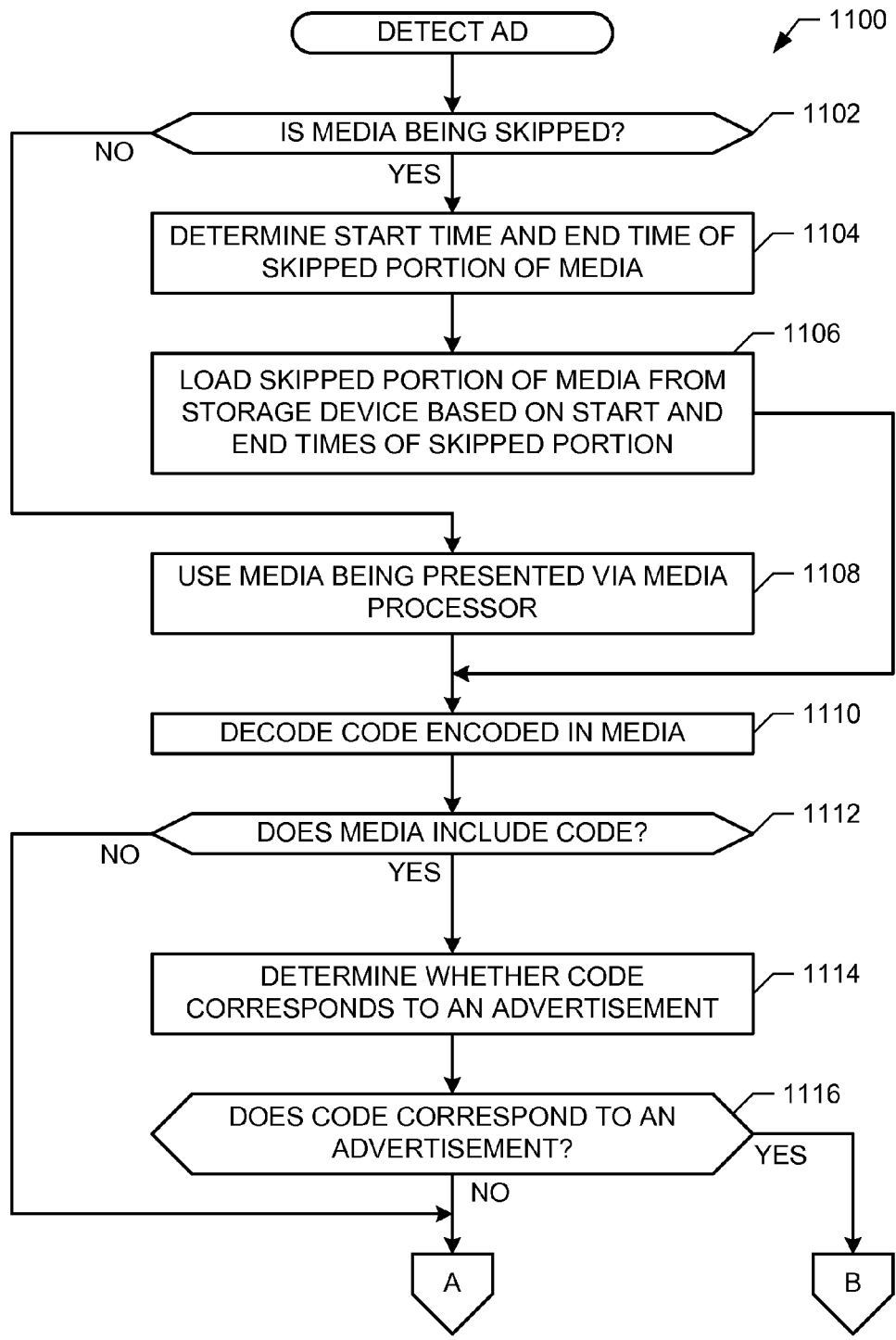
FIGS. 11A and 11B collectively show a flowchart representative of example machine readable instructions which may be executed to implement the example digital media device, the media detection server, the example media processor, the example storage device, the example command interface, the example alternate media initiator, the example media identifying data decoder, the example signature generator, the example network interface, the example wireless interface, the example skip detector, and/or the example advertisement detector of FIGS. 1, 2, and/or 4 to determine whether media being presented is an advertisement.
Figure 11B:
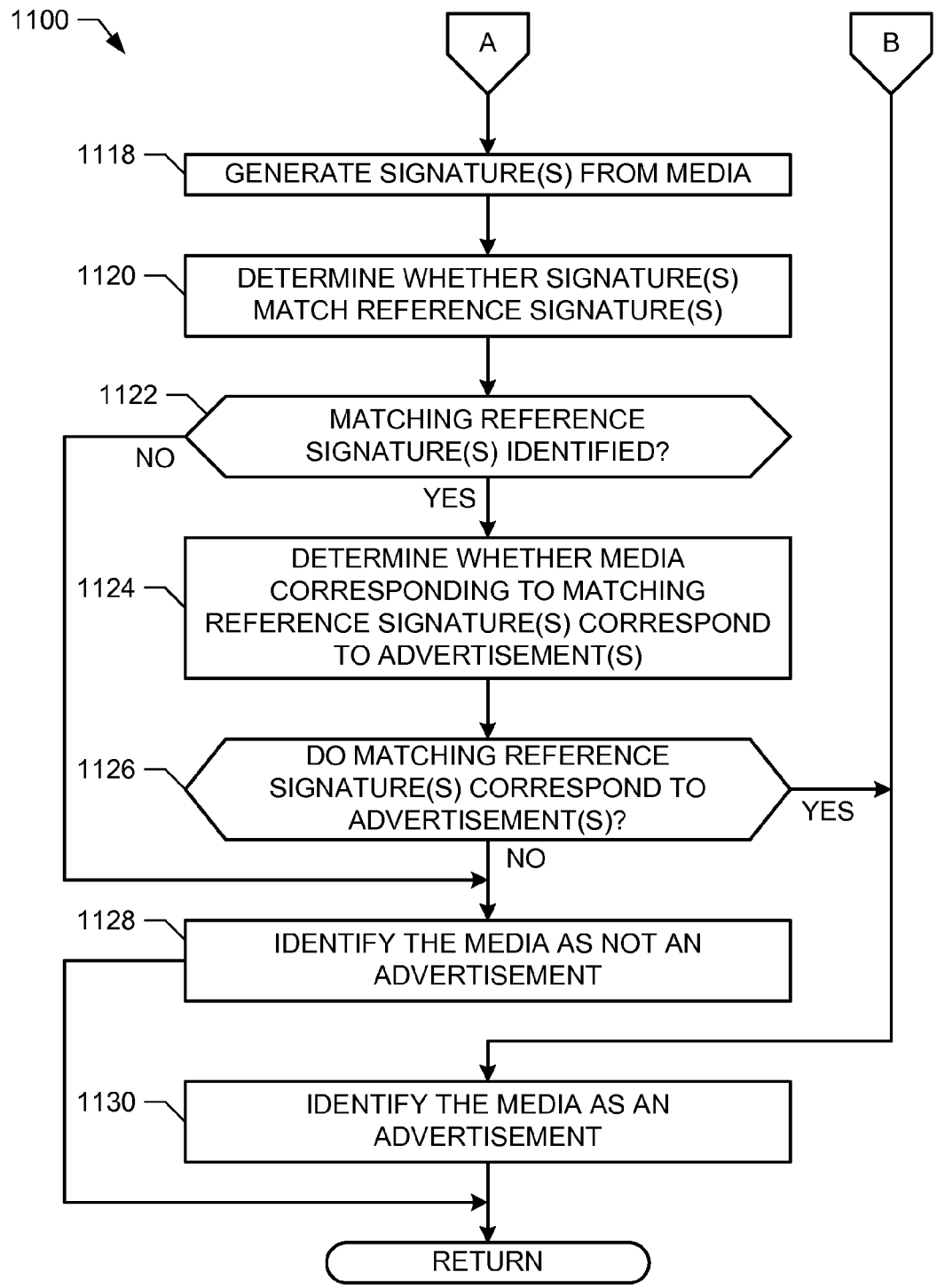

FIGS. 11A and 11B collectively show a flowchart representative of example machine readable instructions 1100 which may be executed to implement the example digital media device 102, the media detection server 118, the example media processor 202, the example storage device 208, the example command interface 210, the example alternate media initiator 212, the example media identifying data decoder 214, the example signature generator 216, the example network interface 218, the example wireless interface 220, the example skip detector 402, and/or the example advertisement detector 408 of FIGS. 1, 2, and/or 4 to determine whether media being presented is an advertisement. The example instructions 1100 of FIGS. 11A-11B may be executed to implement block 1006 of FIG. 10 and/or to implement the example digital media device 102 of FIGS. 1 and/or 2. While the example instructions 1100 of FIGS. 11A-11B are described with reference to an advertisement, the example instructions 1100 may additionally or alternatively be used to identify other types of media of interest.

The example alternate media initiator 212 of FIG. 2 determines whether media (e.g., media being processed by the media processor 202 of FIG. 2) is being skipped (e.g., via the skip detector 402 of FIG. 4) (block 1102). For example, the skip detector 402 may receive an indication of a skip command from the command interface 210, the network interface 218, and/or the wireless interface 220 of FIG. 2. Both media being skipped and media being presented may be analyzed to determine whether the media are advertisements.

If the media is being skipped (block 1102), the example skip detector 402 determines a start time and an end of skipped portion of the media (block 1104). For example, the skip detector 402 may determine a time during the media (e.g., a time with respect to a beginning or other reference point within the media) at which a skip command was received and determine a time during the media at which a skip end command was received. The example media identifying data decoder 214 and/or the example signature generator 216 of FIG. 2 load (e.g., access, cache, use, etc.) the skipped portion of the media from a storage device (e.g., a file or bitstream representing the media stored the storage device 208 of FIG. 2) based on the start and end times of the skipped portion of the media (block 1106).

In some other examples, instead of detecting both the start time and end time of the media prior to loading and/or processing, the example skip detector 402 detects a start time of the skipped portion of the media. The media identifying data decoder 214 and/or the example signature generator 216 begin loading and/or processing (e.g., decoding codes in the media, generating signatures of the media) the skipped portion of the media beginning at the start time of the portion, and continue loading and/or processing the skipped portion of the media until the skip detector 402 detects the end of the skipped portion and provides the end time of the skipped portion to the media identifying data decoder 214 and/or the example signature generator 216. In these examples, the digital media device 102 may provide supplemental media to the secondary media presentation device 104 more rapidly (e.g., during skipping of the media and prior to ending skipping of the media).

If media is not being skipped (block 1102), the example media identifying data decoder 214 and/or the example signature generator 216 of FIG. 2 use media being presented via the media processor 202 (block 1108). For example, the media identifying data decoder 214 and/or the example signature generator 216 may process the media as it is transcoded and/or presented via the primary media presentation device 106.

After obtaining the media (e.g., loading from the storage device 208, receiving from the media processor 202), the media identifying data decoder 214 of FIG. 2 attempts to decode media identifying data encoded in the media (block 1110). The media identifying data may include, for example, one or more codes embedded in the audio or video of the media. The example media identifying data decoder 214 determines whether the media includes media identifying data (block 1112). For example, the media may not include any media identifying data.

If the media includes media identifying data (decoded by the media identifying data decoder 214) (block 1112), the example media identifying data decoder 214 determines whether the media identifying data corresponds to an advertisement (block 1114). For example, the media identifying data decoder 214 may search a database of codes for code(s) matching the code(s) decoded from the media. Additionally or alternatively, the media identifying data decoder 214 may decode the media identifying data based on a predefined format of the media identifying data that may include an indication of whether the media in which the data is embedded is program, an advertisement, or another type of media. In still other examples, the media identifying data decoder 214 may send the media identifying data (e.g., codes) to an external server (e.g., the media detection server 118 of FIG. 1). The media detection server 118 determines whether the media identifying data corresponds to an advertisement and returns an indication to the example media identifying data decoder 214.

If the media does not include media identifying data (block 1112), or if the media identifying data does not correspond to an advertisement (block 1116), the example signature generator 216 of FIG. 2 generates one or more signature(s) from the media (FIG. 11B, block 1118). The example signature generator 216 determines whether the signature(s) match one or more reference signature(s) (block 1120). For example, the signature generator 216 may compare the generated signatures to a library of reference signatures to identify matching reference signatures. Additionally or alternatively, the example, signature generator 216 may provide the signatures to an external server (e.g., the media detection server 118 of FIG. 1) to determine whether the signature(s) match reference signatures.

If the signature generator 216 (or the external server) identifies matching reference signatures (block 1122), the example signature generator 216 (or external server) determines whether the media corresponding to the matching reference signature(s) correspond to advertisement(s) (block 1124). For example, the signature generator 216 (or the external server) may determine whether information describing the matching reference signatures indicate that the matching reference signatures are generated from advertisement(s).

If the matching reference signature(s) do not correspond to advertisement(s) (block 1126), or if there are no matching reference signature(s) identified (block 1122) (and the media was not identified as an advertisement using media identifying data), the example alternate media initiator 212 (e.g., via the advertisement detector 408 of FIG. 4) determines that the media is not an advertisement (block 1128). On the other hand, if matching reference signature(s) correspond to advertisement(s) (block 1126) and/or if media identifying data decoded from the media corresponds to advertisement(s) (block 1116), the example alternate media initiator 212 (e.g., via the advertisement detector 408) identifies the media as an advertisement (block 1130). After identifying the media as an advertisement (block 1130) or as not an advertisement (block 1128), the example instructions 1100 of FIGS. 11A-11B end and control returns to block 1008 of FIG. 10.

Figure 12:
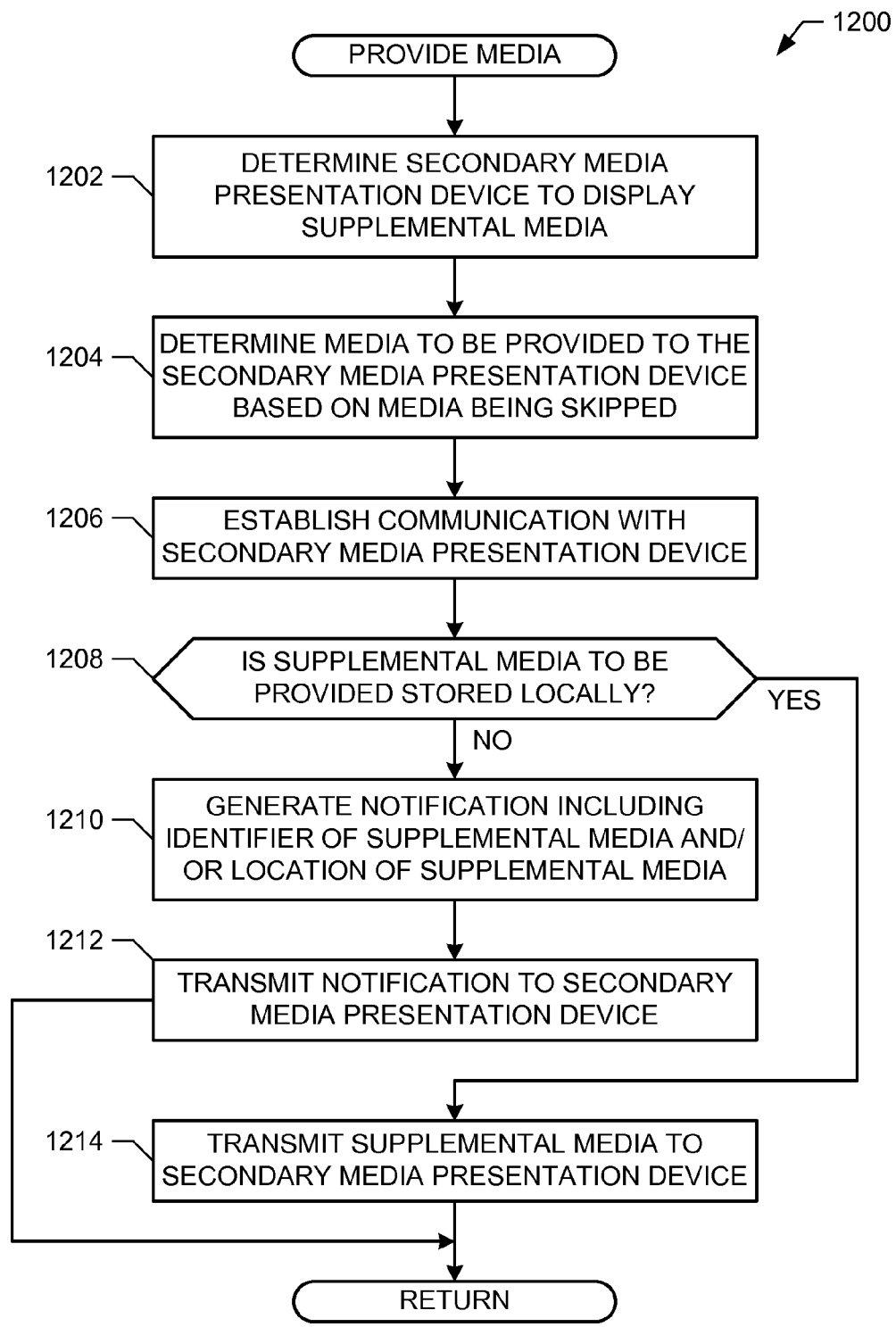
FIG. 12 is a flowchart representative of example machine readable instructions which may be executed to implement the example digital media device, the example storage device, the example alternate media initiator, the example network interface, the example wireless interface, the example secondary device registrar, and/or the example secondary media initiator of FIGS. 1, 2, and/or 4 to cause media to be displayed on a secondary media presentation device.

FIG. 12 is a flowchart representative of example machine readable instructions 1200 which may be executed to implement the example digital media device 102, the example storage device 208, the example alternate media initiator 212, the example network interface 218, the example wireless interface 220, the example secondary device registrar 406, and/or the example secondary media initiator 410 of FIGS. 1, 2, and/or 4 to cause media to be displayed on a secondary media presentation device 104. The example instructions 1200 of FIG. 12 may be executed to implement block 1012 of FIG. 10 to provide supplemental media to a secondary media presentation device.

The example alternate media initiator 212 of FIG. 2 (e.g., via the secondary device registrar 406 of FIG. 4) determines a secondary media presentation device (e.g., the secondary media presentation device 104 of FIGS. 1 and/or 2) to display supplemental media (block 1202). For example, the secondary device registrar 406 may determine which secondary media presentation device 104 is registered and/or to which a connection is established. The example secondary media initiator 410 determines media to be provided to the selected secondary media presentation device 104 based on the media being skipped (block 1204). For example, the secondary media initiator 410 may obtain an indication of the media being skipped (e.g., from the media detection server 118 of FIG. 1) and/or an indication of media to be presented (e.g., from the supplemental media server 120 of FIG. 1).

The example secondary media initiator 410 establishes communication with the selected secondary media presentation device 104 (block 1206). For example, the secondary media initiator 410 may establish communication via any of the network interface 218 (e.g., a wired and/or wireless LAN connection, etc.) and/or the wireless interface 220 (e.g., a Bluetooth connection, a cellular data communications connection, etc.). The example the secondary media initiator 410 determines whether the supplemental media to be provided is stored locally (e.g., at the digital media device 102, in the storage 208, etc.) (block 1208).

If the supplemental media to be provided is stored remotely (e.g., not locally) (block 1208), the example the secondary media initiator 410 generates a notification including an identifier of the supplemental media and/or a location of the supplemental media (block 1210). For example, the secondary media initiator 410 may generate a notification specifying a URL of the supplemental media and/or an identifier of the supplemental media that may be used by the secondary media presentation device 104 to retrieve the supplemental media. The example secondary media initiator 410 transmits the notification (e.g., including the identifier and/or location of the media) to the secondary media presentation device 104 (block 1212). For example, the secondary media initiator 410 may transmit the notification via the communication connection established in block 1206.

If the supplemental media is stored locally (e.g., on the storage device 208), the example secondary media initiator 410 transmits the supplemental media to the secondary media presentation device 104 (block 1214). For example, the secondary media initiator 410 may transmit the supplemental media via the communication connection established in block 1206. After transmitting the notification (block 1212) or transmitting the supplemental media (block 1214), the example instructions 1200 of FIG. 12 end and control returns to block 1214 of FIG. 10.

Figure 13:
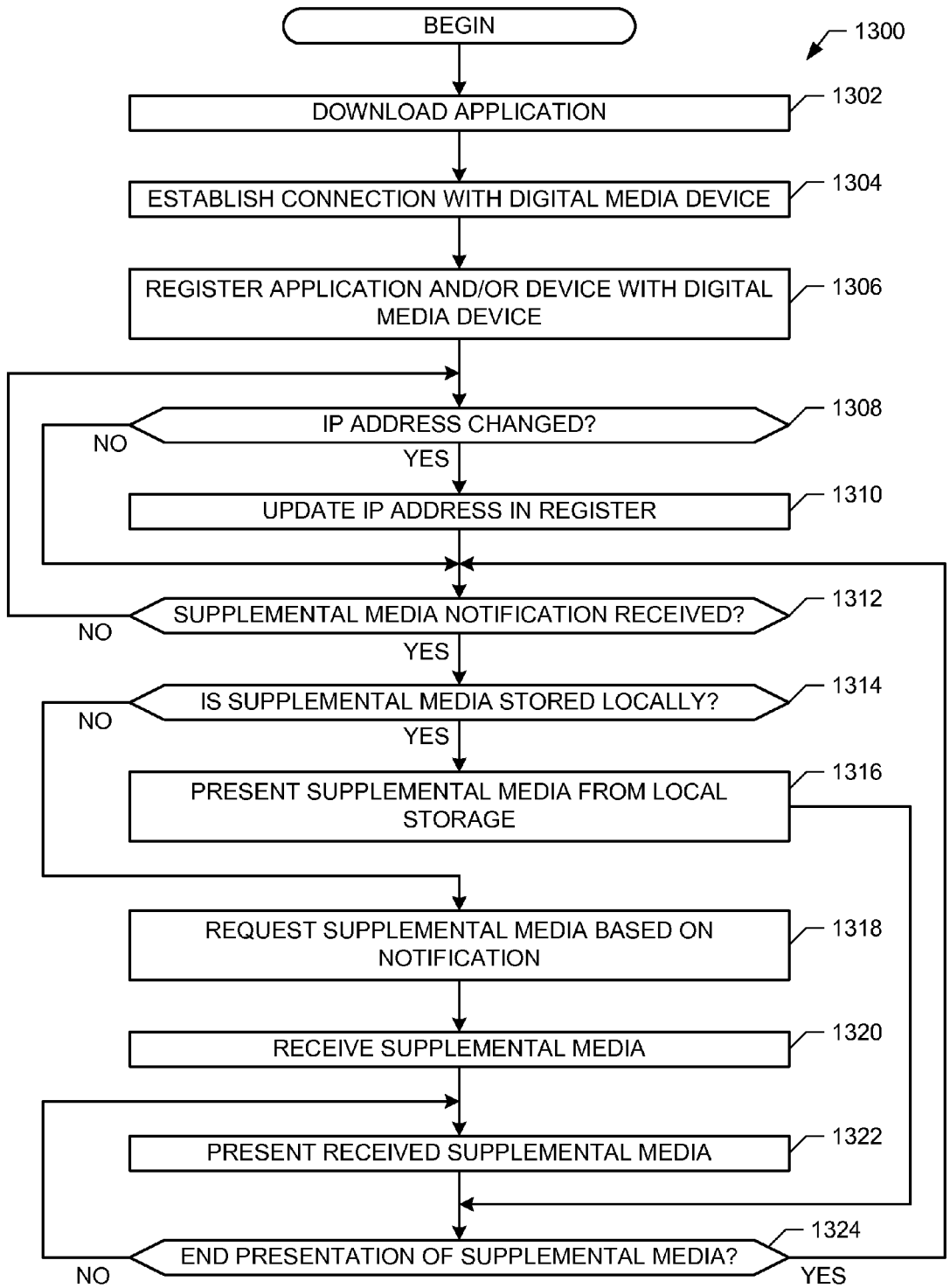
FIG. 13 is a flowchart representative of example machine readable instructions which may be executed to implement the example digital media device and/or the example secondary media presentation device of FIGS. 1 and/or 2 to display media in response to skipping of media via a digital media device.

FIG. 13 is a flowchart representative of example machine readable instructions 1300 which may be executed to implement the example digital media device 102 and/or the example secondary media presentation device 104 of FIGS. 1 and/or 2 to display media in response to skipping of media via a digital media device 102.

The example secondary media presentation device 104 downloads an application (block 1302). For example, the secondary media presentation device 104 may obtain a predetermined application from an application repository (e.g., an "app store"). The example secondary media presentation device 104 establishes a connection with a digital media device (e.g., the digital media device 102 of FIGS. 1 and/or 2) (block 1304). For example, the secondary media presentation device 104 may be configured to establish the connection at an address of the digital media device 102 to enable skipping of media via the digital media device 102.

The example secondary media presentation device 104 registers the application and/or the device 104 with the digital media device 102 (block 1306). For example, the secondary media presentation device 104 may provide information to enable the digital media device 102 to communicate supplemental media to the secondary media presentation device 104. The example secondary media presentation device 104 determines whether an IP address of the secondary media presentation device 104 has changed (block 1308). For example, the IP address of the secondary media presentation device 104 if the secondary media presentation device 104 changes locations and/or networks. The example secondary media presentation device 104 may additionally or alternatively determine whether another address or identifier has changed. If the IP address has changed (block 1308), the example secondary media presentation device 104 updates the IP address in a register (e.g., at the digital media device 102).

The example secondary media presentation device 104 determines whether a supplemental media notification has been received (block 1312). If a notification has not been received (block 1312), control returns to block 1308 to determine whether an IP address has changed (block 1312). If a supplemental media notification has been received (block 1312), the example secondary media presentation device 104 determines whether the supplemental media (e.g., media identified in a notification) is stored locally (block 1314). For example, the application may be provided with one or more advertisements to be presented, which are stored in a storage device of the secondary media presentation device 104. If the supplemental media is stored locally (block 1314), the example secondary media presentation device 104 presents the supplemental media from the local storage (block 1316). For example, the secondary media presentation device 104 may present the media via a display device and/or an audio device of the secondary media presentation device 104.

If the supplemental media is not stored locally (block 1314), the example secondary media presentation device 104 requests the supplemental media based on the notification (block 1318). For example, the secondary media presentation device 104 may request the media identified in the notification from the supplemental media server 120 of FIG. 1. The example secondary media presentation device 104 receives the supplemental media (e.g., from the supplemental media server 120) (block 1320) and presents the received supplemental media (block 1322).

The example secondary media presentation device 104 determines whether presentation of the supplemental media is to end (block 1324). If the presentation of the supplemental media has not ended (or is not to end) (block 1324), control loops to block 1322 to continue presenting the supplemental media. If the presentation of the supplemental media has ended (block 1324), control returns to block 1312 to determine whether another supplemental media notification has been received. Thus, the instructions 1300 of FIG. 13 cause the application and/or the secondary media presentation device 104 monitors for notifications of supplemental media to be presented continually, substantially continually, periodically, aperiodically, and/or at other intervals.

Figure 14:
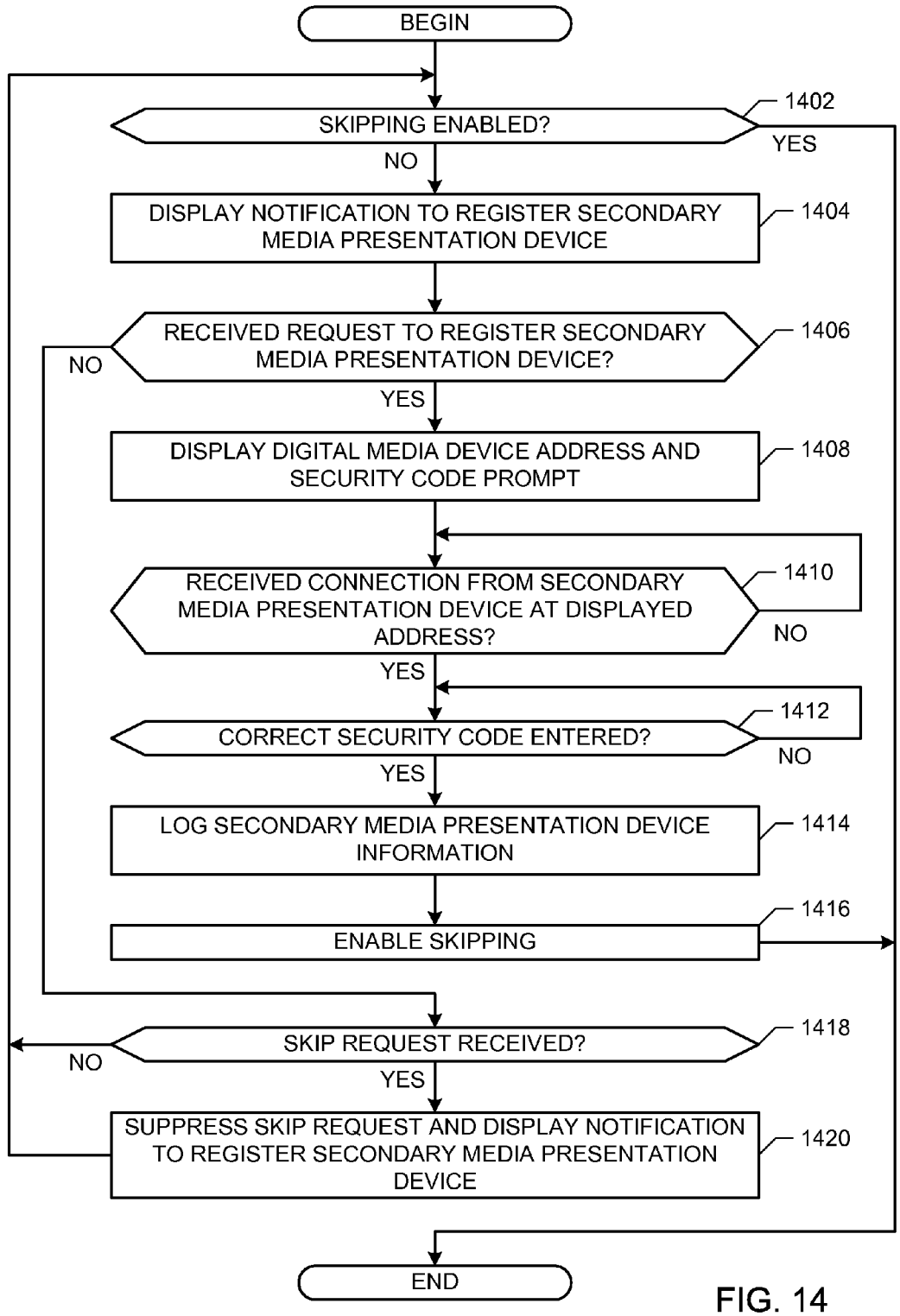
FIG. 14 is a flowchart representative of example machine readable instructions which may be executed to implement the example digital media device, the example media processor, the example display interface, the example alternate media initiator, the example network interface, the example wireless interface, the example skip detector, the example skip enabler, the example secondary device registrar of FIGS. 1 and/or 2 to enable skipping media being played via the digital media device.

FIG. 14 is a flowchart representative of example machine readable instructions 1400 which may be executed to implement the example digital media device 102, the example media processor 202, the example display interface 204, the example alternate media initiator 212, the example network interface 218, the example wireless interface 220, the example skip detector 402, the example skip enabler 404, and/or the example secondary device registrar 406 of FIGS. 1, 2, and/or 4 to enable skipping media being played via the digital media device 102.

The example digital media device 102 of FIGS. 1 and/or 2 determines whether skipping is enabled on the digital media device 102 (e.g., via the alternate media initiator 212, the skip enabler 404, and/or the secondary device registrar 406 of FIGS. 2 and/or 4) (block 1402). For example, skipping (e.g., skipping of media of interest) may be disabled if a secondary media presentation device (e.g., the secondary media presentation device 104 of FIGS. 1 and/or 2) has not been registered with the digital media device 102 (e.g., via the secondary device registrar 406) and/or if communications with a registered secondary media presentation device 104 have been lost for a threshold time.

If skipping is disabled, the example alternate media initiator 212 (e.g., via the skip enabler 404, the secondary device register 406, the media processor 202, and/or the display interface 204 of FIGS. 2 and/or 4) displays a notification to register a secondary media presentation device (block 1404). For example, the alternate media initiator 212 may cause the media processor 202 and the display interface 204 to display an overlay on the primary media presentation device 106 notifying the viewer of the primary media presentation device 106 that registration of a secondary media presentation device 104 (e.g., a mobile device, a tablet computer, etc.) is required to enable skipping of advertisements.

The example secondary device register 406 of FIG. 4 determines whether a request to register a second media presentation device 104 has been received (block 1406). For example, the user may select a menu option to enable skipping and/or to register a secondary media presentation device 104. If a request to register has been received (block 1406), the example secondary device register 406 displays a digital media device address and a security code prompt (block 1408). For example, the secondary device register 406 may cause the primary media presentation device 106 to display a MAC address of the network interface 218 and/or the wireless interface 220 and a prompt for a user to input a security code (e.g., to ensure the user is capable of viewing the primary media presentation device 106). In some examples, the secondary device register 406 automatically detects the presence of a secondary media presentation device 104 executing a designated application on a same communication network (e.g., a LAN or wireless LAN) as the digital media device 102 and/or transmitting a predetermined signal in proximity to the digital media device 102. In some examples, the secondary device register 406 omits the security code prompt.

The example secondary device register 406 of FIG. 4 determines whether a connection from a secondary media presentation device has been received (e.g., via the network interface 218 and/or the wireless interface 220 of FIG. 2 at the address displayed in block 1408) (block 1410). If a connection has not been received (block 1410), control loops to block 1410 to await a connection. When a connection is received (block 1410), the example secondary device register 406 determines whether a correct security code has been entered (e.g., by the user via the command interface 210, the network interface 218, and/or the wireless interface 220) (block 1412). If a correct security code has not been entered (e.g., an incorrect code has been entered, no code has been entered (block 1412), control loops to block 1412 to receive a correct security code. In some examples, at block 1410 and/or block 1412, a loop time out may return control to another appropriate block, such as block 1402, 1404, 1406, and/or 1408.

When a correct security code is entered (block 1412), the example secondary device register 406 logs secondary media presentation device information (block 1414). For example, the secondary device register 406 may store a device name, a device address, an application identification number, and/or any other identifying and/or locating information for the registered secondary media presentation device 104 in a storage device. The example skip enabler 404 enables skipping (block 1416).

If a request to register a secondary media presentation device 104 is not received (block 1406), the example skip detector 402 of FIG. 4 determines whether a skip request has been received (block 1418). Block 1418 may be implemented as or in a similar or identical manner to block 1004 of FIG. 10. If a skip request has been received (block 1418), the example skip enabler 404 suppresses the skip request and displays a notification to register a secondary media presentation device (block 1420). The example notification of block 1420 may be similar or identical to the notification displayed in block 1404, including indicating to the viewer of the primary media presentation device 104 that skipping is disabled. If a skip request is not received (block 1418), or after suppressing a skip request (block 1420), control returns to block 1402 to determine whether skipping has been enabled.

When skipping is enabled (block 1402 or block 1416), the example instructions 1400 may end. The example digital media device 102 may execute the instructions 1400 after enabling skipping if, for example, connection(s) with registered secondary media presentation devices are lost and/or if all secondary media presentation devices are unregistered.

Figure 15:
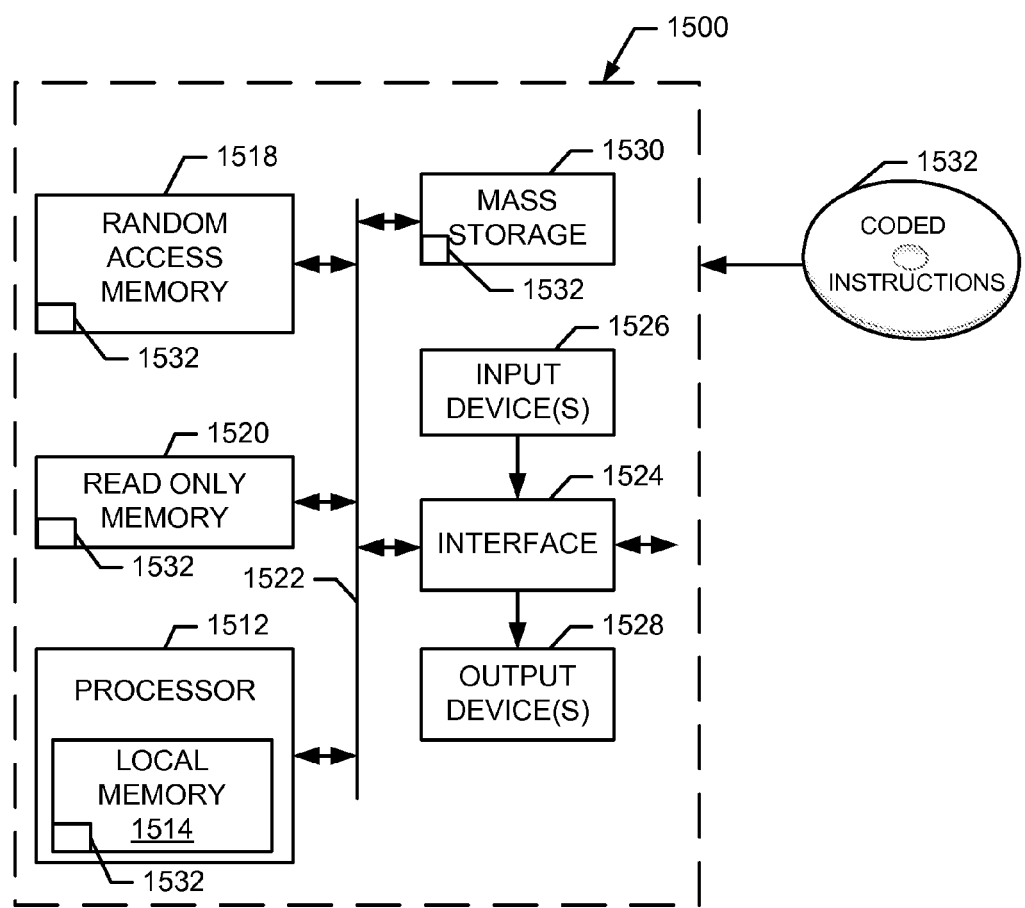
FIG. 15 is a block diagram of an example processor platform capable of executing the instructions of FIGS. 10, 11A-11B, 12, 13, and/or 14 to implement the system of FIGS. 1, 2, 3, 4, 6, and/or 7.

FIG. 15 is a block diagram of an example processor platform 1500 capable of executing the instructions of FIGS. 10, 11A-11B, 12, 13, and/or 14 to implement the system 100 of FIGS. 1, 2, 3, 4, 6, and/or 7. The processor platform 1500 can be, for example, a server, a personal computer, a mobile device (e.g., a cell phone, a smart phone, a tablet such as an iPad™), a personal digital assistant (PDA), an Internet appliance, a digital video recorder, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 10, 11A-11B, 12, 13, 14, and/or 15 may be stored in the mass storage device 1528, in the volatile memory 1514, in the non-volatile memory 1516, and/or on a removable tangible computer readable storage medium such as a CD or DVD.

Example methods and apparatus disclosed herein increase the return on investment for advertisers by increasing a number of exposures to advertisements purchased during media that is time-shifted for playback. At the same time, example methods and apparatus permit users to control time-shifted and live media in a manner intended by the users' equipment, such as DVRs. Furthermore, example methods and apparatus disclosed herein more accurately and more reliably detect advertising and characteristics of the advertising using media identifying data. Accordingly, example methods and apparatus can ensure that appropriate advertisement exposure credit is given and/or ensure that appropriate advertisements are delivered for time-shifted media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   obtaining, at a digital media device, media identifying data from audio data of a portion of first media being presented via the digital media device;
   determining that the portion of the first media is an advertisement based on the media identifying data;
   detecting, at the digital media device, a command to cause the digital media device to skip the portion of the first media;
   in response to detecting the command, determining whether advertisement skipping is disabled at the digital media device based on whether (1) a second device is registered in association with the digital media device and (2) the second device is in communication with the digital media device;
   when advertisement skipping is not disabled at the digital media device, providing an indication to the second device, the indication to cause the second device to present second media via the second device; and
   disabling advertisement skipping at the digital media device when either (1) no devices for presenting the second media are registered in association with the digital media device or (2) no devices for presenting the second media are in communication with the digital media device.

2. A method as defined in claim 1, wherein providing the indication to the second device comprises providing a location from which the second device is to obtain the second media.

3. A method as defined in claim 1, further comprising disabling advertisement skipping at the digital media device when the digital media device is not associated with the second device and the digital media device is not associated with an application installed on the second device.

4. A method as defined in claim 3, further comprising enabling advertisement skipping at the digital media device via the command in response to at least one of determining that the digital media device is associated with the second device or determining that the digital media device is associated with the application installed on the second device.

5. A method as defined in claim 1, wherein obtaining the media identifying data is in response to detecting the command, the media identifying data being obtained using the audio data, the audio data being stored on a storage device of the digital media device.

6. A method as defined in claim 1, wherein obtaining the media identifying data is performed prior to detecting the command based on the audio being played, and determining that the portion of the first media being presented is an advertisement is in response to the command.

7. A method as defined in claim 1, wherein the second device comprises a mobile device or a portable computing device.

8. A method as defined in claim 1, wherein the command comprises a fast forward command, a skip command, or a channel change command.

9. A method as defined in claim 1, wherein the first media being presented via the digital media device comprises at least one of time-shifted media or live media.

10. A method as defined in claim 1, wherein determining that the portion of the first media is an advertisement comprises providing the media identifying data to a server and receiving an indication that the first media is an advertisement from the server.

11. A method as defined in claim 1, wherein obtaining the media identifying data comprises at least one of decoding a code present in the audio data or generating a signature based on the audio data.

12. An apparatus, comprising:
    a media detector to detect media identifying data associated with a portion of first media being presented via a digital media device;
    a media type identifier to determine that the portion of the first media is an advertisement based on the media identifying data;
    a skip detector to detect a command to cause the digital media device to skip the portion of the first media;
    an alternate media initiator to:
    determine, in response to the skip detector detecting the command, whether advertisement skipping is disabled at the digital media device based on whether (1) a second device is registered in association with the digital media device and (2) the second device is in communication with the digital media device; and
    when advertisement skipping is not disabled at the digital media device, provide an indication to the second device, the indication to cause the second device to present second media via the second device; and
    a skip enabler to disable advertisement skipping when either (1) no devices for presenting the second media are registered in association with the digital media device or (2) no devices for presenting the second media are in communication with the digital media device.

13. An apparatus as defined in claim 12, further comprising a network interface to connect to the second device via at least one of a wired connection or a wireless connection, the alternate media initiator to provide the indication to the second device via the network interface.

14. An apparatus as defined in claim 13, wherein the indication comprises at least one of an identifier of the second media or a location from which the second media can be obtained.

15. An apparatus as defined in claim 12, further comprising a wireless interface to connect to the second device via at least one of a Bluetooth connection or a cellular data connection, the alternate media initiator to provide the indication to the second device via the wireless interface.

16. An apparatus as defined in claim 12, further comprising:
    a device registrar to receive at least one of an identification of the second device or an identification of an application executing on the second device, the skip enabler to enable the alternate media initiator to skip media in response to receiving the at least one of the identification of the second device or the identification of the application executing on the second device.

17. An apparatus as defined in claim 12, wherein the media detector comprises a signature generator to generate a signature of the at least a portion of the first media, the alternate media initiator to provide the indication to the second device based on a comparison of the signature and a reference signature.

18. An apparatus as defined in claim 12, wherein the media detector comprises a decoder and the media identifying data is a code, the decoder to transmit the code to a server, and the media type identifier is to determine that the portion of the first media is an advertisement based on receiving an indication the code is associated with an advertisement.

19. A tangible computer readable storage medium comprising machine readable instructions which, when executed, cause a digital media device to at least:
    determine media identifying data from audio data of a portion of first media being presented via the digital media device;
    determine that the portion of the first media is an advertisement based on the media identifying data;
    detect a command to cause the digital media device to skip the portion of the first media;
    in response to detecting the command, determine whether advertisement skipping is disabled at the digital media device based on whether (1) a second device is registered in association with the digital media device and (2) the second device is in communication with the digital media device;
    when advertisement skipping is not disabled at the digital media device, provide an indication to the second device, the indication to cause the second device to present second media via the second device; and
    disable advertisement skipping at the digital media device when either (1) no devices for presenting the second media are registered in association with the digital media device or (2) no devices for presenting the second media are in communication with the digital media device.

20. A storage medium as defined in claim 19, wherein the instructions are to cause the digital media device to provide the indication to the second device by providing a location from which the second device is to obtain the second media.

21. A storage medium as defined in claim 19, wherein the instructions are further to cause the digital media device to disable advertisement skipping when the digital media device is not associated with the second device and the digital media device is not associated with an identification of an application installed on the second device.

22. A storage medium as defined in claim 21, wherein the instructions are further to cause the digital media device to enable advertisement skipping via the command in response to at least one of determining that the digital media device is associated with the second device or determining that the digital media device is associated with the application installed on the second device.

23. A storage medium as defined in claim 19, wherein the instructions are to cause the digital media device to detect the media identifying data in response to detecting the command, the digital media device to detect the media identifying data by accessing the audio data stored on a storage device of the digital media device.

24. A storage medium as defined in claim 19, wherein the instructions are to cause the digital media device to detect the media identifying data prior to detecting the command based on the audio being played, and to determine that the portion of the first media being presented is an advertisement in response to the command.

25. A storage medium as defined in claim 19, wherein the second device comprises a mobile device or a portable computing device.

26. A storage medium as defined in claim 19, wherein the command comprises a fast forward command, a skip command, or a channel change command.

27. A storage medium as defined in claim 19, wherein the first media being presented via the digital media device comprises at least one of time-shifted media or live media.

28. A storage medium as defined in claim 19, wherein the instructions are to cause the digital media device to determine that the portion of the first media is an advertisement by providing the media identifying data to a server and receiving an indication that the first media is an advertisement from the server.

29. A storage medium as defined in claim 19, wherein the instructions are to cause the digital media device to obtain the media identifying data by at least one of decoding a code present in the audio data or generating a signature based on the audio data.

* * * * *

UNITED STATES PATENT AND TRADEMARK OFFICE
CERTIFICATE OF CORRECTION

| | |
|---|---|
| PATENT NO. | : 8,966,521 B2 |
| APPLICATION NO. | : 13/827943 |
| DATED | : February 24, 2015 |
| INVENTOR(S) | : Soundararajan et al. |

It is certified that error appears in the above-identified patent and that said Letters Patent is hereby corrected as shown below:

In the Claims

Column 25, line 36: delete "receiving"

Signed and Sealed this
Fourteenth Day of July, 2015

Michelle K. Lee
*Director of the United States Patent and Trademark Office*